(12) United States Patent
Guan et al.

(10) Patent No.: US 11,846,756 B2
(45) Date of Patent: Dec. 19, 2023

(54) CAMERA LENS ASSEMBLY

(71) Applicant: Zhejiang Sunny Optical Co., Ltd., Ningbo (CN)

(72) Inventors: Lei Guan, Ningbo (CN); Xinquan Wang, Ningbo (CN); Fujian Dai, Ningbo (CN); Liefeng Zhao, Ningbo (CN)

(73) Assignee: Zhejiang Sunny Optical Co., Ltd., Ningbo (CN)

( * ) Notice: Subject to any disclaimer, the term of this patent is extended or adjusted under 35 U.S.C. 154(b) by 362 days.

(21) Appl. No.: 16/864,422

(22) Filed: May 1, 2020

(65) Prior Publication Data
US 2020/0371315 A1 Nov. 26, 2020

(30) Foreign Application Priority Data

May 24, 2019 (CN) .......................... 201910437471.1

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC ............ G02B 27/0012; G02B 27/0025; G02B 13/0045; G02B 13/06; G02B 13/18; G02B 13/04; G02B 13/001; G02B 9/62; G02B 9/64; G02B 3/04; H04N 5/2254

USPC ....... 359/757, 759, 756, 713, 754, 751, 750, 359/766
See application file for complete search history.

(56) References Cited

U.S. PATENT DOCUMENTS

| 8,599,498 | B2 | 12/2013 | Huang |
| 2014/0063323 | A1* | 3/2014 | Yamazaki .......... G02B 13/0045 359/713 |
| 2015/0015971 | A1 | 1/2015 | Huang |
| 2016/0306141 | A1* | 10/2016 | Chen .................. G02B 13/0045 |
| 2018/0039046 | A1* | 2/2018 | Lee .......................... G02B 9/62 |
| 2020/0319430 | A1* | 10/2020 | Hosono ............. G02B 13/0045 |

OTHER PUBLICATIONS

Examination Report from Intellectual Property of India for Application No. 202044019528, dated Sep. 9, 2021, 4 pages.

* cited by examiner

*Primary Examiner* — Travis S Fissel
(74) *Attorney, Agent, or Firm* — Barnes & Thornburg LLP

(57) ABSTRACT

The present disclosure discloses a camera lens assembly comprising, sequentially from an object side to an image side along an optical axis, a stop; a first lens having a positive refractive power with an object-side surface thereof being a convex surface; a second lens having a positive refractive power; a third lens; a fourth lens; a fifth lens having a positive refractive power; a sixth lens having a negative refractive power with an object-side surface thereof being a concave surface; and wherein, a distance Ts along the optical axis from the stop to the object-side surface of the first lens satisfies: 0<Ts<0.2 mm.

19 Claims, 14 Drawing Sheets

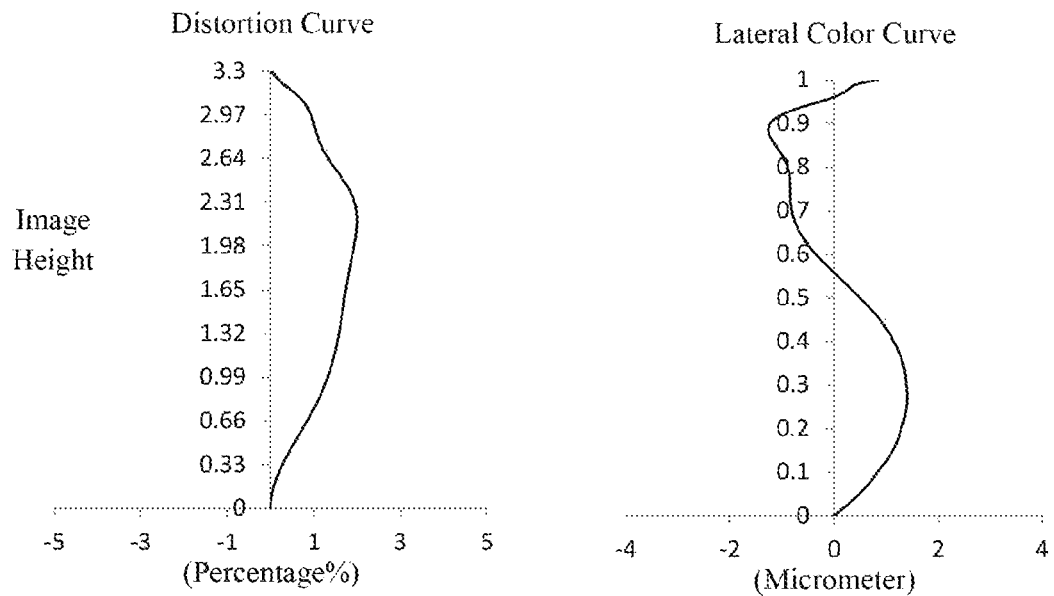
Fig. 6C
Fig. 6D
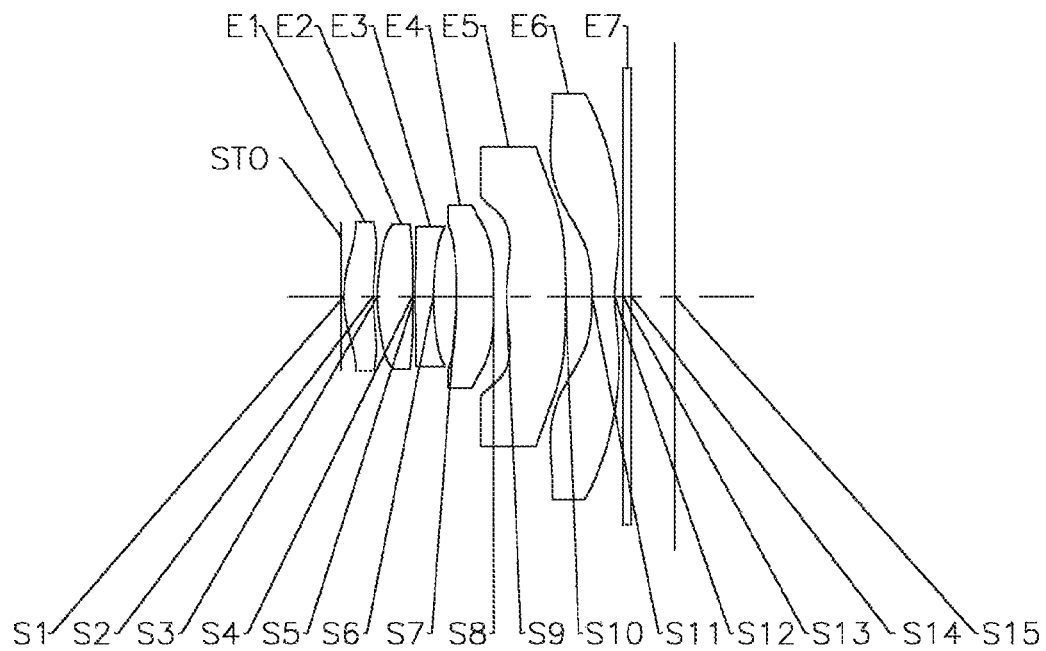
Fig. 7

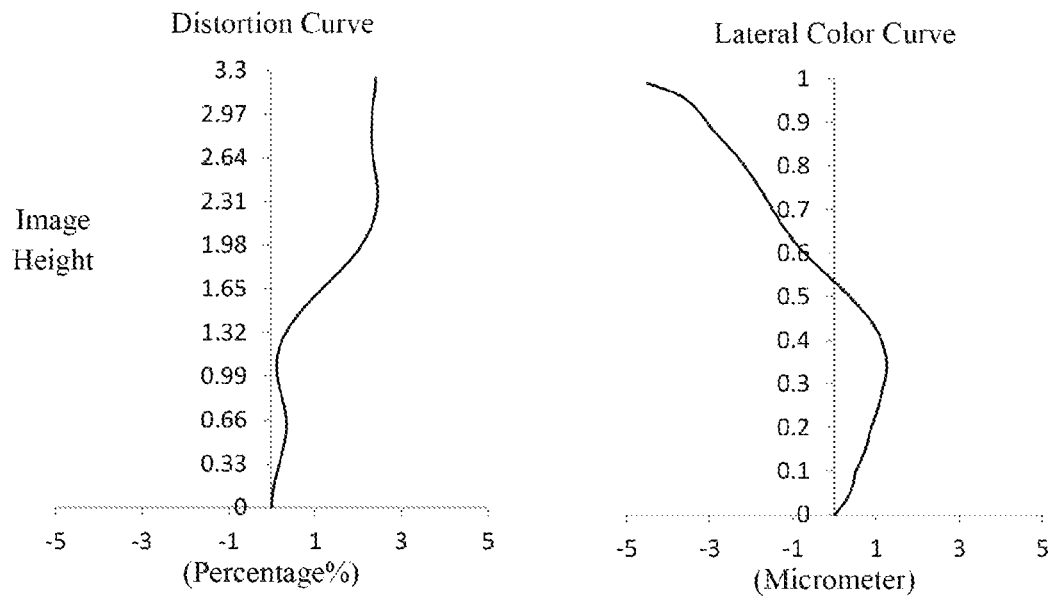
Fig. 14C
Fig. 14D
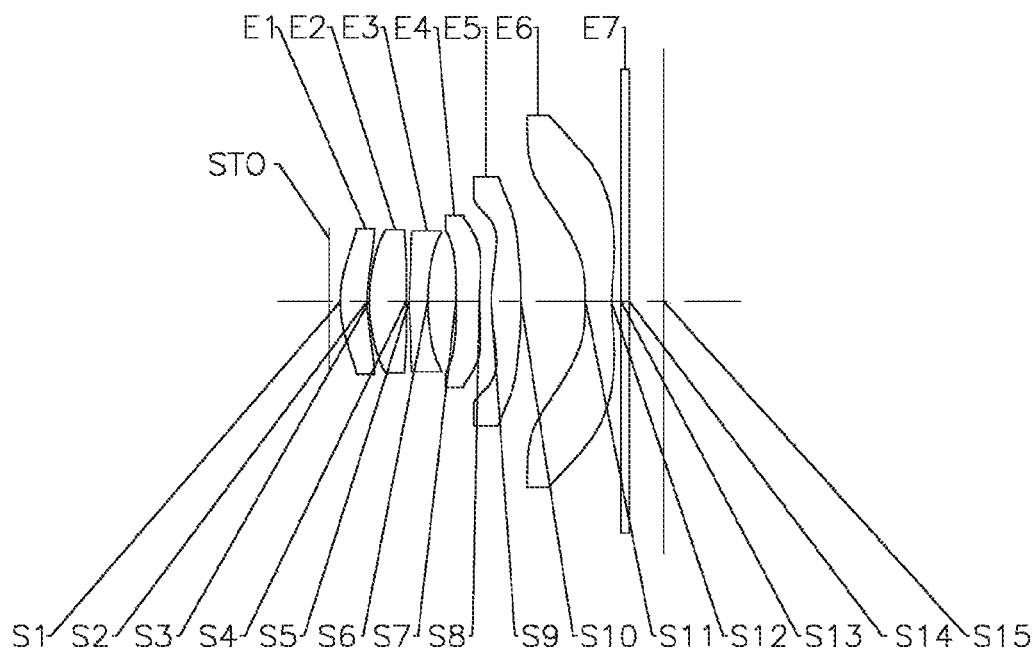
Fig. 15

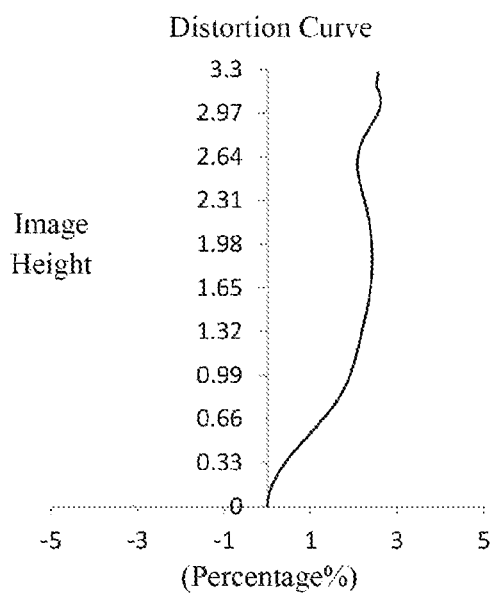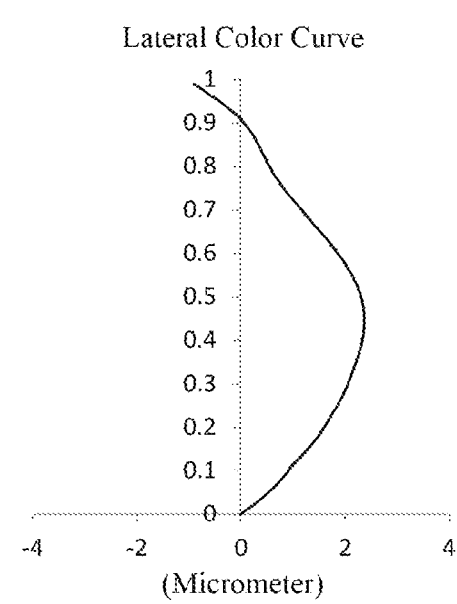
Fig. 18C
Fig. 18D

CAMERA LENS ASSEMBLY

CROSS-REFERENCE TO RELATED APPLICATION

This application claims benefit of priority to Chinese Patent Application No. 201910437471.1 filed on May 24, 2019 before the China National Intellectual Property Administration, the entire disclosure of which is incorporated herein by reference in its entity.

TECHNICAL FIELD

The present disclosure relates to a camera lens assembly, specifically to a under-screen camera lens assembly including sixth lenses.

BACKGROUND

As the era of full-screen is coming, it is a technical problem to be solved urgently to further improve the full-screen (that is, to realize a true full-screen). The appropriate setting of the front camera of a mobile phone is the key to achieve a high screen-to-body ratio. Currently, in order to achieve a high screen-to-body ratio, most major mobile phone manufacturers apply a notch screen, a drilling screen, a lift-type camera, a slide-type camera and other technical solutions. Although these technical solutions have further improved the screen-to-body ratio, they also introduce some drawbacks.

SUMMARY

The present disclosure provides a camera lens assembly such as a under-screen camera lens assembly that is applicable to portable electronic products, can at least or partly address at least one of the above disadvantages of the prior art.

According to an aspect of the present disclosure, a camera lens assembly is provided, which may include sequentially from an object side to an image side along an optical axis: a stop; a first lens having a positive refractive power with an object-side surface thereof is a convex surface; a second lens having a positive refractive power; a third lens; a fourth lens; a fifth lens having a positive refractive power; a sixth lens having a negative refractive power with an object-side surface thereof is a concave surface.

In one implementation, a distance Ts along the optical axis from the stop to the object-side surface of the first lens may satisfy: $0<Ts<0.2$ mm.

In one implementation, a total effective focal length f of the camera lens assembly and an effective focal length f6 of the sixth lens may satisfy $-1.6 \leq f/f6 \leq -1.0$.

In one implementation, the total effective focal length f of the camera lens assembly and a radius of curvature R11 of the object-side surface of the sixth lens may satisfy $-1.0<f/R11<-0.5$.

In one implementation, an abbe number V4 of the fourth lens and an abbe number V5 of the fifth lens may satisfy $|V4-V5| \leq 15$.

In one implementation, the total effective focal length f of the camera lens assembly and an effective focal length f5 of the fifth lens may satisfy $0.5<f/f5 \leq 1.52$.

In one implementation, the total effective focal length f of the camera lens assembly and an effective focal length f3 of the third lens may satisfy $-0.6<f/f3<0.1$.

In one implementation, the total effective focal length f of the camera lens assembly, an effective focal length f1 of the first lens and an effective focal length f2 of the second lens may satisfy $f/f1+f/f2 \leq 1.3$.

In one implementation, the total effective focal length f of the camera lens assembly, a radius of curvature R9 of an object-side surface of the fifth lens, and a radius of curvature R10 of an image-side surface of the fifth lens may satisfy $f/R9-f/R10<3.0$.

In one implementation, a radius of curvature R5 of the object-side surface of the third lens and a radius of curvature R6 of an image-side surface of the third lens may satisfy $0<R5/R6<3.5$.

In one implementation, a spaced interval T56 along the optical axis between the fifth lens and the sixth lens and a center thickness CT6 along the optical axis of the sixth lens may satisfy $0.8 \leq T56/CT6<2.6$.

In one implementation, a spaced interval T12 along the optical axis between the first lens and the second lens, a spaced interval T23 along the optical axis between the second lens and the third lens and a sum $\Sigma AT$ of spaced intervals along the optical axis between any two adjacent lenses among the first lens to the sixth lens may satisfy $(T12+T23)/\Sigma AT<0.1$.

In one implementation, a combined focal length f123 of the first lens, the second lens and the third lens and a spaced interval T34 along the optical axis between the third lens and the fourth lens may satisfy $9<f123/T34<17$.

In one implementation, a distance TTL along the optical axis from the object-side surface of the first lens to an image plane of the camera lens assembly and half of a diagonal length ImgH of an effective pixel area on an image plane of the camera lens assembly may satisfy $TTL/ImgH<1.5$.

In one implementation, the total effective focal length f of the camera lens assembly and the half of the diagonal length ImgH of the effective pixel area on the image plane of the camera lens assembly may satisfy $0.85 \leq ImgH/f \leq 1.0$.

The present disclosure employs sixth lenses. By disposing the stop in front and properly controlling the distance between the stop and the first lens, the above-mentioned camera lens assembly can be integrated under a display screen, and thereby realizing the under-screen camera technology. At the same time, the camera lens assembly described above has at least one advantageous effect such as ultra-thin, high imaging quality, easy processing and the like by properly disposing the refractive power, the surface shape, the center thickness of each lens, and the spaced interval along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 6C illustrates a distortion curve of the camera lens assembly according to embodiment 3;

FIG. 6D illustrates a lateral color curve of the camera lens assembly according to embodiment 3;

FIG. 7 is a schematic structural view of a camera lens assembly according to embodiment 4 of the present disclosure;

FIG. 14C illustrates a distortion curve of the camera lens assembly according to embodiment 7;

FIG. 14D illustrates a lateral color curve of the camera lens assembly according to embodiment 7;

FIG. 15 is a schematic structural view of a camera lens assembly according to embodiment 8 of the present disclosure;

FIG. 18C illustrates a distortion curve of the camera lens assembly according to embodiment 9; and FIG. 18D illustrates a lateral color curve of the camera lens assembly according to embodiment 9.

DETAILED DESCRIPTION OF EMBODIMENTS

Figure 1:
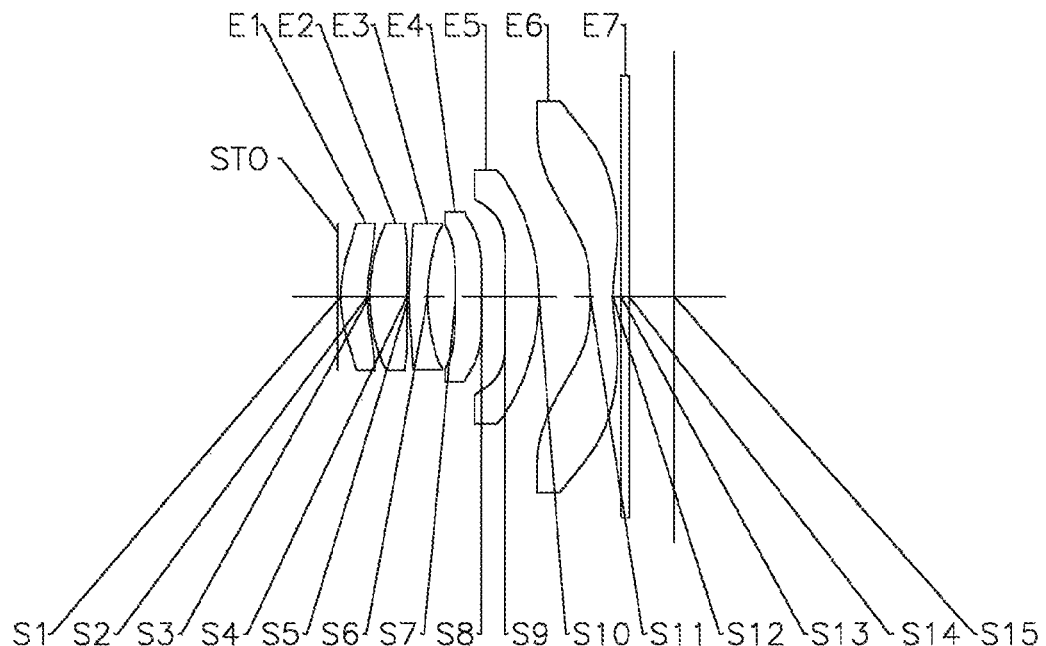
FIG. 1 is a schematic structural view of a camera lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

A camera lens assembly according to exemplary implementations of the present disclosure may include, for example, sixth lenses having refractive powers, i.e., a first lens, a second lens, a third lens, a fourth lens, a fifth lens and a sixth lens. The sixth lenses are sequentially arranged from an object side to an image side along an optical axis. Among the first lens to the sixth lens, an air gap may be exist between any two adjacent lenses.

In an exemplary implementation, the first lens may have a positive refractive power, an object-side surface thereof may be convex surface; the second lens may have a positive refractive power; the third lens has a positive or a negative refractive power; the fourth lens has a positive or a negative refractive power; the fifth lens may have a positive refractive power; and a sixth lens may have a negative refractive power, and an object-side surface thereof may be a concave surface.

In an exemplary implementation, an image-side surface of the sixth lens may be a concave surface.

In an exemplary implementation, the camera lens assembly may include a stop. The stop may be disposed between the object side and the first lens. Alternatively, a distance Ts along the optical axis from the stop to the object-side surface of the first lens may satisfy: $0<Ts<0.2$ mm. More specifically, Ts may further satisfy $0.036$ mm$\leq Ts \leq 0.15$ mm. Since the stop of the under-screen camera lens assembly is close to the display screen, the diffraction of light by the grating in the display screen can be reduced by properly controlling the on-axis distance from the stop to the object-side surface of the first lens.

In an exemplary implementation, the camera lens assembly according to the present disclosure may satisfy $-1.6 \leq f/f6 \leq -1.0$, wherein f is a total effective focal length of the camera lens assembly, and f6 is an effective focal length of the sixth lens. More specifically, f and f6 may further satisfy $-1.56 \leq f/f6 \leq -1.22$. By properly disposing the total effective focal length of the lens assembly and the effective focal length of the sixth lens, the size of the lens assembly can be reduced more effectively, so that an excessive concentrated refractive power of the system can be avoided while maintaining the ultra-thin characteristic of the lens assembly, and the system aberration can be better corrected in conjunction with the front five lenses.

In an exemplary implementation, the camera lens assembly according to the present disclosure may satisfy $0.85 \leq ImgH/f \leq 1.0$, wherein f is a total effective focal length of the camera lens assembly and ImgH is half of a diagonal length of an effective pixel area on an image plane of the camera lens assembly. More specifically, ImgH and f may further satisfy $0.85 \leq ImgH/f \leq 0.94$. This arrangement enables the lens assembly to support a larger field-of-view and a wider imaging range. The field-of-view angle of the lens assembly provided in the present disclosure are all above 78 degrees, and a larger field-of-view can be achieved by appropriately adjusting the image height and the effective focal length of the system.

In an exemplary implementation, the camera lens assembly according to the present disclosure may satisfy $-1.0 < f/R11 < -0.5$, wherein f is a total effective focal length of the camera lens assembly, and R11 is a radius of curvature of the object-side surface of the sixth lens. More specifically, f and R11 may further satisfy $-0.83 \leq f/R11 \leq -0.62$. The system may have a better aberration correction capability and can obtain a better manufacturability while maintaining miniaturization, by controlling the ratio of the total effective focal length of the system with respect to the radius of curvature of the object-side surface of the sixth lens to be within an appropriate range.

In an exemplary implementation, the camera lens assembly according to the present disclosure may satisfy $|V4-V5| \leq 15$, wherein V4 is an abbe number of the fourth lens and V5 is an abbe number of the fifth lens. More specifically, V4 and V5 may further satisfy $0 \leq |V4-V5| \leq 14.38$. The system chromatic aberration can be effectively corrected by properly disposing the abbe numbers of the fourth lens and the fifth lens together with other lenses.

In an exemplary implementation, the camera lens assembly according to the present disclosure may satisfy $0.5 < f/f5 \leq 1.52$, wherein f is the total effective focal length of the camera lens assembly, and f5 is the effective focal length of the fifth lens. More specifically, f and f5 may further satisfy $0.64 \leq f/f5 \leq 1.52$. By properly disposing the total effective focal length of the lens assembly and the effective focal length of the fifth lens, the size of the lens assembly can be reduced more effectively, so that an excessive concentrated refractive power of the system can be avoided while maintaining the ultra-thin characteristic of the lens assembly, and the system aberration can be better corrected in conjunction with other lenses.

In an exemplary implementation, the camera lens assembly according to the present disclosure may satisfy $-0.6 < f/f3 < 0.1$. wherein f is the total effective focal length of the camera lens assembly, and f3 is the total effective focal length of the third lens. More specifically, f and f3 may further satisfy $-0.51 \leq f/f3 \leq 0.04$. By properly controlling the ratio of the total effective focal length of the lens assembly with respect to the effective focal length of the third lens, the spherical aberration contribution of the third lens can be controlled to be within an appropriate range, so that the on-axis field-of-view area of the system has a better imaging quality.

In an exemplary implementation, the camera lens assembly according to the present disclosure may satisfy $f/f1+f/f2 \leq 1.3$, wherein f is the total effective focal length of the camera lens assembly, f1 is the effective focal length of the first lens, and f2 is the effective focal length of the second lens. More specifically, f, f1 and f2 may further satisfy $0.80 \leq f/f1+f/f2 \leq 1.30$, for example $0.94 \leq f/f1+f/f2 \leq 1.26$. By properly disposing the ratio of the effective focal length of the lens assembly with respect to the effective focal length of the first lens and the ratio of the effective focal length of the lens assembly with respect to the effective focal length of the second lens, the size of the lens assembly can be reduced more effectively, so that an excessive concentrated refractive power of the system can be avoided while maintaining the ultra-thin characteristic of the lens assembly, and the system aberration can be better corrected in conjunction with the rear lenses.

In an exemplary implementation, the camera lens assembly according to the present disclosure may satisfy f/R9−f/R10<3.0, wherein f is the total effective focal length of the lens assembly, R9 is a radius of curvature of the object-side surface of the fifth lens, and R10 is a radius of curvature of the image-side surface of the fifth lens. More specifically, f, R9 and R10 may further satisfy 1.0≤f/R9−f/R10≤2.8, for example, 1.14≤f/R9−f/R10≤2.71. Properly controlling the radii of curvature of object-side surface and the image-side surface of the fifth lens and the total effective focal length of the system can effectively reduce the size of the system so that the refractive power of the system is properly disposed rather than excessively concentrated in the fifth lens, and is advantageous to the correction of aberrations of the rear lenses while enabling the fifth lens to maintain good processing technology. Alternatively, the object-side surface of the fifth lens may be a convex surface, and the image-side surface thereof may also be a convex surface.

In an exemplary implementation, the camera lens assembly according to the present disclosure may satisfy 0<R5/R6<3.5, wherein R5 is a radius of curvature of the object-side surface of the third lens, and R6 is a radius of curvature of the image-side surface of the third lens. More specifically, R5 and R6 may further satisfy 0.5<R5/R6<3.5, for example, 0.98≤R5/R6≤3.43. Properly controlling the radii of curvature of object-side surface and the image-side surface of the third lens can effectively reduce the size of the system so that the refractive power of the system is properly disposed rather than excessively concentrated in the third lens, and is advantageous to the correction of aberrations of the rear lenses. Alternatively, the object-side surface of the third lens may be a convex surface, and the image-side surface thereof may be a concave surface.

In an exemplary implementation, the camera lens assembly according to the present disclosure may satisfy 0.8≤T56/CT6<2.6, wherein T56 is a spaced interval along the optical axis between the fifth lens and the sixth lens, and CT6 is a center thickness along the optical axis of the sixth lens. More specifically, T56 and CT6 may further satisfy 0.86≤T56/CT6≤2.53. By properly controlling the air interval between the fifth lens and the sixth lens and the center thickness of the sixth lens, the risk of ghost image of the system can be effectively reduced, and the size of the lens assembly will be reduced.

In an exemplary implementation, the camera lens assembly according to the present disclosure may satisfy (T12+T23)/ΣAT<0.1, wherein T12 is a spaced interval along the optical axis between the first lens and the second lens, T23 is a spaced interval along the optical axis between the second lens and the third lens, and ΣAT is a sum of spaced intervals along the optical axis between any two adjacent lenses among the first lens to the sixth lens. More specifically, T12, T23 and ΣAT may further satisfy 0.04≤(T12+T23)/ΣAT≤0.09. By controlling (T12+T23)/ΣAT to be within a proper range, the risk of ghost image caused by the first lens and the second lens can be effectively reduced firstly, and the size of the system can be reduced to make it easier for the lens assembly to maintain ultra-thin characteristic secondly.

In an exemplary implementation, the camera lens assembly according to the present disclosure may satisfy 9<f123/T34<17, wherein f123 is a combined focal length of the first lens, the second lens and the third lens, and T34 is a spaced interval along the optical axis between the third lens and the fourth lens. More specifically, f123 and T34 may further satisfy 9.89≤f123/T34≤15.73. Properly controlling the value of f123/T34 can effectively reduce the size of the lens assembly, and since the combination of the first lens to the third lens has a positive refractive power, it will be beneficial to the refractive power distribution of the entire lens assembly, avoid excessive concentration of the refractive power, and help the lens assembly to compensate the vertical chromatic aberration and the lateral chromatic aberration. Meanwhile, the positive refractive power of the combination of the first lens to the third lens and the negative refractive power of the sixth lens can reduce the aberration of the edge field-of-view effectively while increasing the light flux.

In an exemplary implementation, the camera lens assembly according to the present disclosure may satisfy TTL/ImgH<1.5, wherein TTL is a distance along the optical axis from the object-side surface of the first lens to an image plane of the camera lens assembly, and ImgH is half of a diagonal length of an effective pixel area on the image plane of the camera lens assembly. More specifically, TTL and ImgH may further satisfy TTL/ImgH<1.4, for example, 1.31≤TTL/ImgH≤1.38. The total size of the lens assembly can be reduced effectively, and the ultra-thin characteristic and miniaturization of the lens assembly can be realized, so that the lens assembly can be better applied to more and more ultra-thin products on the markets.

Alternatively, the camera lens assembly described above may further include an optical filter for correcting chromatic aberration and/or a protective glass for protecting a photosensitive element on the image plane.

The camera lens assembly of the above implementation of the present disclosure may employ a plurality of lenses, such as sixth lenses as described above. By properly disposing the refractive power, the surface shape, the center thickness of each lens, and spaced intervals along the optical axis between the lenses, the size and the sensitivity of the camera lens assembly can be effectively reduced, and the processability of the camera lens assembly can be improved, such that the camera lens assembly is more advantageous for production processing and can be applied to portable electronic products. The present disclosure provides a technical solution for camera lens assembly with sixth lenses and having a stop in front, to meet the need to integrate the camera lens assembly under the display screen so as to realize the under-screen camera technology. By applying the camera lens assembly of the present disclosure, the under-screen camera technology similar to the under-screen optical fingerprint recognition module can be used, that is, the front camera is integrated under the display screen to solve the placement problem of the front camera. This solution is beneficial to achieve a true full screen.

In the implementations of the present disclosure, at least one of the surfaces of each lens is aspheric surface, i.e., at least one of the object-side surface and the image-side surface of each lens among the first lens, the second lens, the third lens, the fourth lens, the fifth lens and the sixth lens is aspheric surface. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality. Alternatively, the object-side surface and the image-side surface of each of the first lens, the second lens, the third lens, the fourth lens, the fifth lens and the sixth lens are both aspheric surface.

However, it will be understood by those skilled in the art that the number of lenses constituting the camera lens assembly can be varied to achieve the various results and advantages described in this specification without departing from the technical solution claimed by the present disclosure. For example, although the implementation are described by taking sixth lenses as an example, the camera lens assembly is not limited to including sixth lenses. The camera lens assembly can also include other numbers of lenses if desired. Specific embodiments applicable to the camera lens assembly of the above implementations will be further described below with reference to the accompanying drawings.

Embodiment 1

A camera lens assembly according to embodiment 1 of present disclosure is described below with reference to FIG. 1 to FIG. 2D. FIG. 1 is a schematic structural view of a camera lens assembly according to embodiment 1 of the present disclosure.

As shown in FIG. 1, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 1 is a table showing basic parameters of the camera lens assembly of embodiment 1, wherein the units for the radius of curvature, the thickness and focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | 0.0400 | | | | |
| S1 | aspheric | 1.7484 | 0.3561 | 1.54 | 56.1 | 15.99 | −15.7569 |
| S2 | aspheric | 2.0292 | 0.0300 | | | | 0.0000 |
| S3 | aspheric | 2.0000 | 0.5000 | 1.54 | 56.1 | 4.05 | −1.8968 |
| S4 | aspheric | 19.0433 | 0.0280 | | | | 0.0000 |
| S5 | aspheric | 4.3011 | 0.2500 | 1.67 | 19.2 | −11.01 | 0.0000 |
| S6 | aspheric | 2.6640 | 0.3717 | | | | 5.2912 |
| S7 | aspheric | −79.7377 | 0.3482 | 1.54 | 56.1 | −25.96 | 0.0000 |
| S8 | aspheric | 17.2584 | 0.3087 | | | | 0.0000 |
| S9 | aspheric | 10.0000 | 0.4620 | 1.56 | 44.9 | 3.80 | 0.0000 |
| S10 | aspheric | −2.6808 | 0.6844 | | | | −8.4011 |
| S11 | aspheric | −5.4170 | 0.3000 | 1.54 | 56.1 | −2.66 | 3.6058 |
| S12 | aspheric | 2.0245 | 0.1110 | | | | −16.8942 |
| S13 | spherical | infinite | 0.1100 | 1.52 | 64.2 | | |
| S14 | spherical | infinite | 0.6000 | | | | |
| S15 | spherical | infinite | | | | | |

In the embodiment 1, a total effective focal length of the camera lens assembly satisfies f=3.84 mm, a distance along the optical axis from the object-side surface S1 of the first lens E1 to the image plane S15. satisfies TTL=4.46 mm, and a maximal field-of-view of the camera lens assembly FOV=79.0°.

In the embodiment 1, the object-side surface and the image-side surface of any one of the first lens E1 to the sixth lens E6 are aspheric, and the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S12 in embodiment 1.

TABLE 2

| Surface number | A4 | A6 | A8 | A10 | A12 | A14 | A16 | A18 | A20 |
|---|---|---|---|---|---|---|---|---|---|
| S1 | 3.0416E−01 | −7.3746E−01 | 1.5035E+00 | −2.6288E+00 | 3.4042E+00 | −3.2415E+00 | 2.2397E+00 | −1.0119E+00 | 2.1896E−01 |
| S2 | −2.1974E−01 | 6.6407E−02 | 1.3145E−03 | −1.4614E−05 | 0.0000E+00 | 0.0000E+00 | 0.0000E+00 | 0.0000E+00 | 0.0000E+00 |
| S3 | −1.0834E−01 | 1.2645E−01 | −2.1443E−02 | 0.0000E+00 | 0.0000E+00 | 0.0000E+00 | 0.0000E+00 | 0.0000E+00 | 0.0000E+00 |
| S4 | −1.1759E−02 | 5.7778E−02 | −5.1855E−01 | 6.7493E−01 | −2.5537E−01 | −4.4220E−04 | 0.0000E+00 | 0.0000E+00 | 0.0000E+00 |
| S5 | −5.5261E−02 | 8.1379E−02 | −5.6262E−01 | 5.9152E−01 | 1.9056E−01 | −3.7076E−01 | 1.7096E−02 | 4.8657E−02 | 0.0000E+00 |
| S6 | −5.8187E−02 | 5.2001E−04 | 2.0953E−01 | −1.5650E+00 | 4.1728E+00 | −5.5360E+00 | 3.8382E+00 | −1.1175E+00 | 0.0000E+00 |
| S7 | −1.8851E−01 | 4.1878E−01 | −2.6282E+00 | 1.1670E+01 | −3.2823E+01 | 5.6755E+01 | −5.8930E+01 | 3.3713E+01 | −8.1352E+00 |
| S8 | −2.1547E−01 | 1.3164E−01 | −5.2452E−01 | 2.0792E+00 | −5.0416E+00 | 7.1131E+00 | −5.8453E+00 | 2.6021E+00 | −4.8010E−01 |
| S9 | −3.2500E−02 | −2.4718E−01 | 5.1307E−01 | −6.5479E−01 | 4.7429E−01 | −2.0333E−01 | 3.9348E−02 | 0.0000E+00 | 0.0000E+00 |
| S10 | 4.0375E−03 | −9.3227E−02 | 9.2984E−02 | 5.4104E−02 | −1.7046E−01 | 1.3444E−01 | −5.1273E−02 | 9.8015E−03 | −7.5713E−04 |
| S11 | −3.3649E−01 | 2.4262E−01 | −5.8603E−02 | −1.1882E−02 | 1.2329E−02 | −3.7537E−03 | 5.9448E−04 | −4.9434E−05 | 1.7117E−06 |
| S12 | −1.7791E−01 | 1.1583E−01 | −4.5164E−02 | 9.7896E−03 | −7.4425E−04 | −1.6827E−04 | 5.0050E−05 | −5.0259E−06 | 1.8422E−07 |

Figures 2A, 2B:
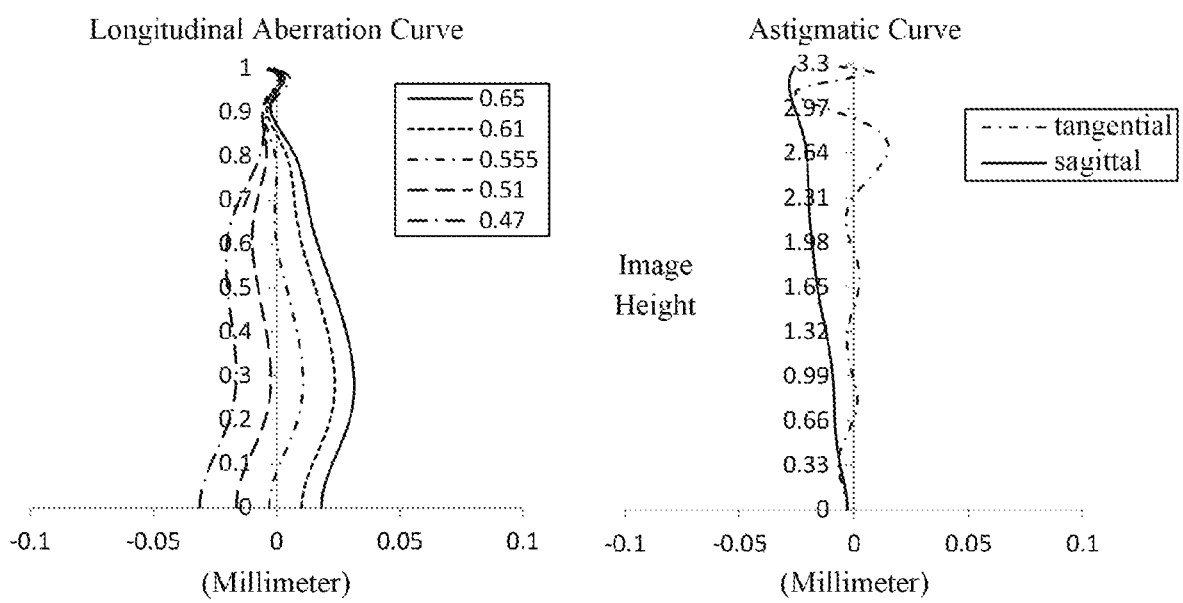
FIG. 2A illustrates a longitudinal aberration curve of the camera lens assembly according to embodiment 1.
FIG. 2B illustrates an astigmatic curve of the camera lens assembly according to embodiment 1.
Figures 2C, 2D:
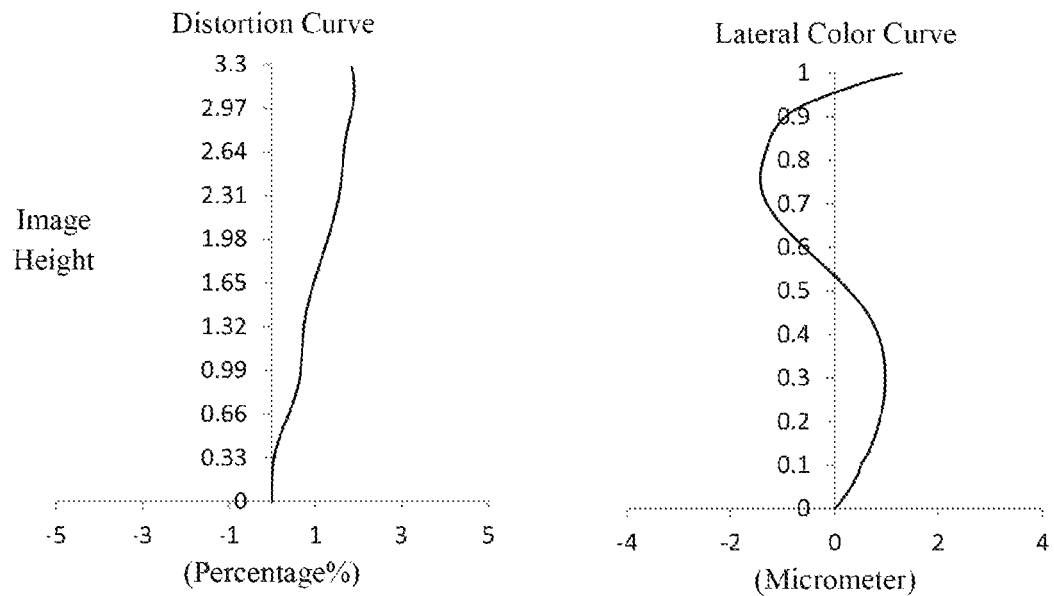
FIG. 2C illustrates a distortion curve of the camera lens assembly according to embodiment 1.
FIG. 2D illustrates a lateral color curve of the camera lens assembly according to embodiment 1.

FIG. 2A illustrates a longitudinal aberration curve of the camera lens assembly according to embodiment 1, representing deviations of focal points converged by light of different wavelengths after passing through the camera lens assembly. FIG. 2B illustrates an astigmatic curve of the camera lens assembly according to embodiment 1, representing a curvature of a tangential plane and a curvature of a sagittal plane. FIG. 2C illustrates a distortion curve of the camera lens assembly according to embodiment 1, representing amounts of distortion corresponding to different image heights. FIG. 2D illustrates a lateral color curve of the camera lens assembly according to embodiment 1, representing deviations of different image heights on an image plane after light passes through the camera lens assembly. It can be seen from FIG. 2A to FIG. 2D that the camera lens assembly provided in embodiment 1 can achieve a good imaging quality.

Embodiment 2

Figure 3:
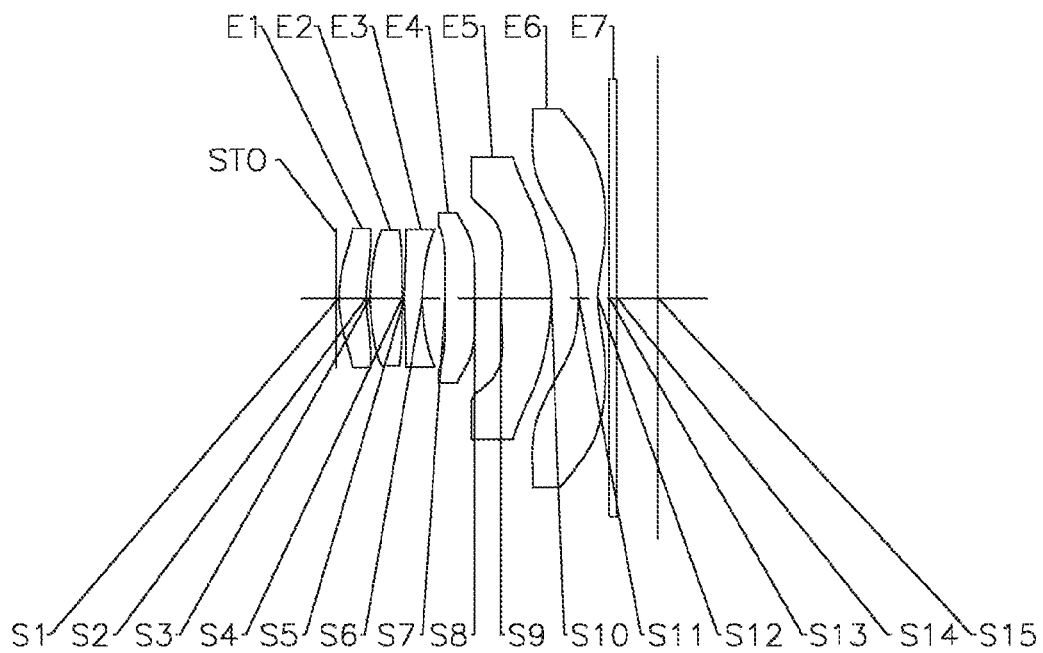
FIG. 3 is a schematic structural view of a camera lens assembly according to embodiment 2 of the present disclosure.

A camera lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the camera lens assembly according to embodiment 2 of the present disclosure.

As shown in FIG. 3, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a convex surface. The third lens E3 has a negative refractive power, and an object-side surface S5 thereof is a convex surface, and an image-side surface S6 thereof is a concave surface. The fourth lens E4 has a positive refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 2, a total effective focal length of the camera lens assembly satisfies f=3.47 mm, a distance along the optical axis from the object-side surface S1 of the first lens E1 to the image plane S15. satisfies TTL=4.26 mm, and a maximal field-of-view of the camera lens assembly satisfies FOV=82.8°.

Table 3 is a table showing basic parameters of the camera lens assembly of embodiment 2, wherein the units for the radius of curvature, the thickness and focal length are millimeter (mm). Table 4 below shows high-order coefficients applicable to each aspheric surface S1-S12 in embodiment 2, wherein the surface shape of each aspheric surface can be defined by the formula (1) given in the above embodiment 1.

TABLE 3

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | spherical | infinite | infinite | | | | |
| STO | spherical | infinite | 0.0380 | | | | |
| S1 | aspheric | 1.6911 | 0.3655 | 1.54 | 56.1 | 9.89 | −18.2336 |
| S2 | aspheric | 2.2748 | 0.0500 | | | | −0.0848 |
| S3 | aspheric | 2.3829 | 0.4302 | 1.54 | 56.1 | 3.86 | −2.7554 |
| S4 | aspheric | −16.8589 | 0.0300 | | | | −30.4014 |
| S5 | aspheric | 6.8610 | 0.2400 | 1.67 | 19.2 | −6.86 | 38.6489 |
| S6 | aspheric | 2.7327 | 0.3054 | | | | 5.5889 |
| S7 | aspheric | 15.7717 | 0.3981 | 1.54 | 56.1 | 40.00 | 4.7230 |
| S8 | aspheric | 56.2923 | 0.3453 | | | | −99.0000 |
| S9 | aspheric | 5.6139 | 0.6730 | 1.56 | 44.9 | 3.38 | −7.8758 |
| S10 | aspheric | −2.7829 | 0.3651 | | | | −7.7466 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S11 | aspheric | −5.2092 | 0.2600 | 1.54 | 56.1 | −2.23 | 3.8310 |
| S12 | aspheric | 1.6140 | 0.1516 | | | | −10.2255 |
| S13 | spherical | infinite | 0.1045 | 1.52 | 64.2 | | |
| S14 | spherical | infinite | 0.5432 | | | | |
| S15 | spherical | infinite | | | | | |

TABLE 4

| Surface number | A4 | A6 | A8 | A10 | A12 | A14 | A16 | A18 | A20 |
|---|---|---|---|---|---|---|---|---|---|
| S1 | 3.9514E−01 | −1.1892E+00 | 2.8568E+00 | −5.7287E+00 | 7.9453E+00 | −7.4461E+00 | 4.9061E+00 | −2.2570E+00 | 5.5206E−01 |
| S2 | −1.6023E−01 | −3.0361E−01 | 4.1638E−02 | −2.4306E−01 | 6.0531E+00 | −1.5212E+01 | 1.6433E+01 | −8.5732E+00 | 1.7949E+00 |
| S3 | −3.0732E−02 | −2.4758E−01 | 1.7300E−01 | −1.9306E+00 | 1.3048E+01 | −2.8619E+01 | 2.9787E+01 | −1.5334E+01 | 3.1590E+00 |
| S4 | 1.5875E−01 | −6.4832E−01 | 2.7053E−01 | 1.5879E+00 | −1.4069E+00 | −2.6613E+00 | 5.1017E+00 | −3.0884E+00 | 6.5660E−01 |
| S5 | 5.3631E−02 | −4.4075E−01 | −2.6035E−01 | 2.8091E+00 | −4.2112E+00 | 1.9914E+00 | 4.4977E−01 | −4.5864E−01 | 0.0000E+00 |
| S6 | −7.5304E−02 | 1.2164E−01 | −7.0905E−01 | 1.8203E+00 | −2.4641E+00 | 1.9516E+00 | −8.8640E−01 | 2.1525E−01 | 0.0000E+00 |
| S7 | −1.8058E−01 | 5.0834E−01 | −2.5357E+00 | 9.1788E+00 | −2.3040E+01 | 3.7584E+01 | −3.7976E+01 | 2.1533E+01 | −5.2083E+00 |
| S8 | −2.3930E−01 | 3.3367E−01 | −1.2246E+00 | 3.6470E+00 | −7.6026E+00 | 1.0137E+01 | −8.2104E+00 | 3.6729E+00 | −6.8983E−01 |
| S9 | −1.0509E−01 | 3.4559E−03 | −7.0427E−02 | 1.6172E−01 | −3.3865E−01 | 3.8331E−01 | −2.6610E−01 | 1.0766E−01 | −1.8225E−02 |
| S10 | 3.5363E−02 | −1.3282E−01 | 2.2086E−01 | −2.0828E−01 | 1.0535E−01 | −2.7233E−02 | 2.8219E−03 | 9.6655E−05 | −2.9662E−05 |
| S11 | −3.7813E−01 | 3.2843E−01 | −1.2036E−01 | 8.1497E−03 | 1.1232E−02 | −4.9568E−03 | 9.7026E−04 | −9.5471E−05 | 3.8358E−06 |
| S12 | −2.0822E−01 | 1.8703E−01 | −1.1309E−01 | 4.6300E−02 | −1.2906E−02 | 2.4004E−03 | −2.8592E−04 | 1.9863E−05 | −6.1491E−07 |

Figure 4A:
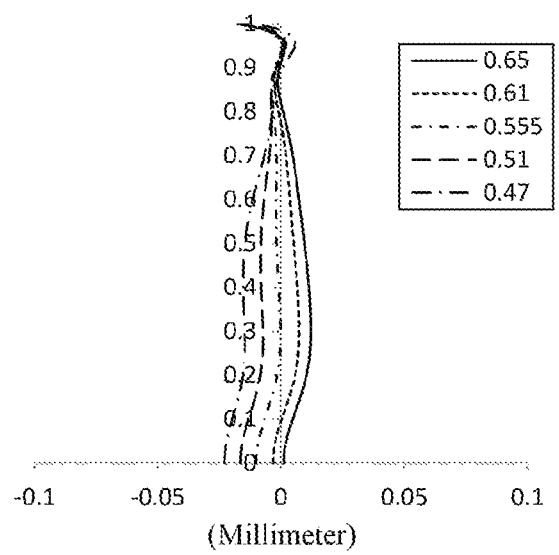
FIG. 4A illustrates a longitudinal aberration curve of the camera lens assembly according to embodiment 2.
Figure 4B:
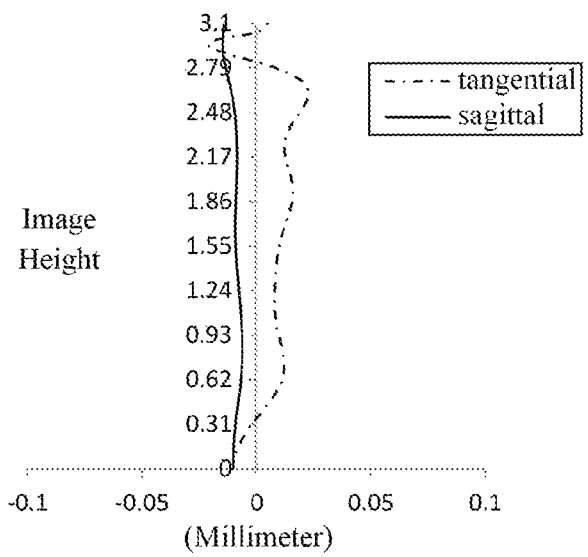
FIG. 4B illustrates an astigmatic curve of the camera lens assembly according to embodiment 2.
Figure 4C:
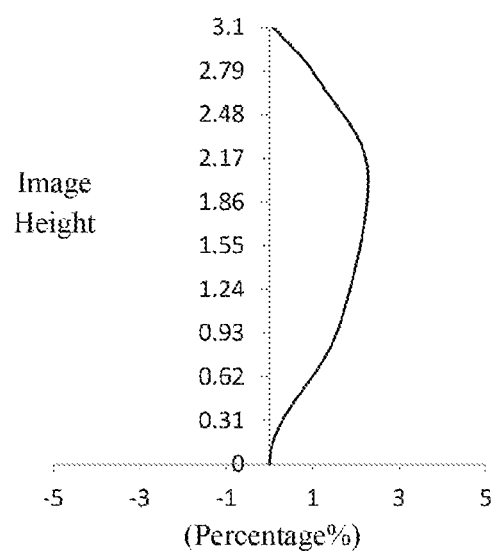
FIG. 4C illustrates a distortion curve of the camera lens assembly according to embodiment 2.
Figure 4D:
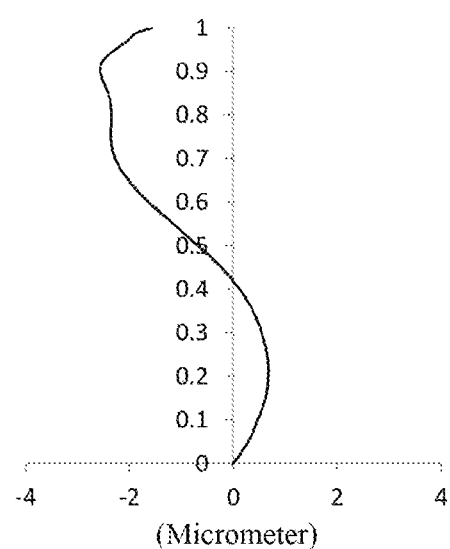
FIG. 4D illustrates a lateral color curve of the camera lens assembly according to embodiment 2.

FIG. 4A illustrates a longitudinal aberration curve of the camera lens assembly according to embodiment 2, representing deviations of focal points converged by light of different wavelengths after passing through the camera lens assembly. FIG. 4B illustrates an astigmatic curve of the camera lens assembly according to embodiment 2, representing a curvature of a tangential plane and a curvature of a sagittal plane. FIG. 4C illustrates a distortion curve of the camera lens assembly according to embodiment 2, representing amounts of distortion corresponding to different image heights. FIG. 4D illustrates a lateral color curve of the camera lens assembly according to embodiment 2, representing deviations of different image heights on an image plane after light passes through the camera lens assembly. It can be seen from FIG. 4A to FIG. 4D that the camera lens assembly provided in embodiment 2 can achieve a good imaging quality.

Embodiment 3

Figure 5:
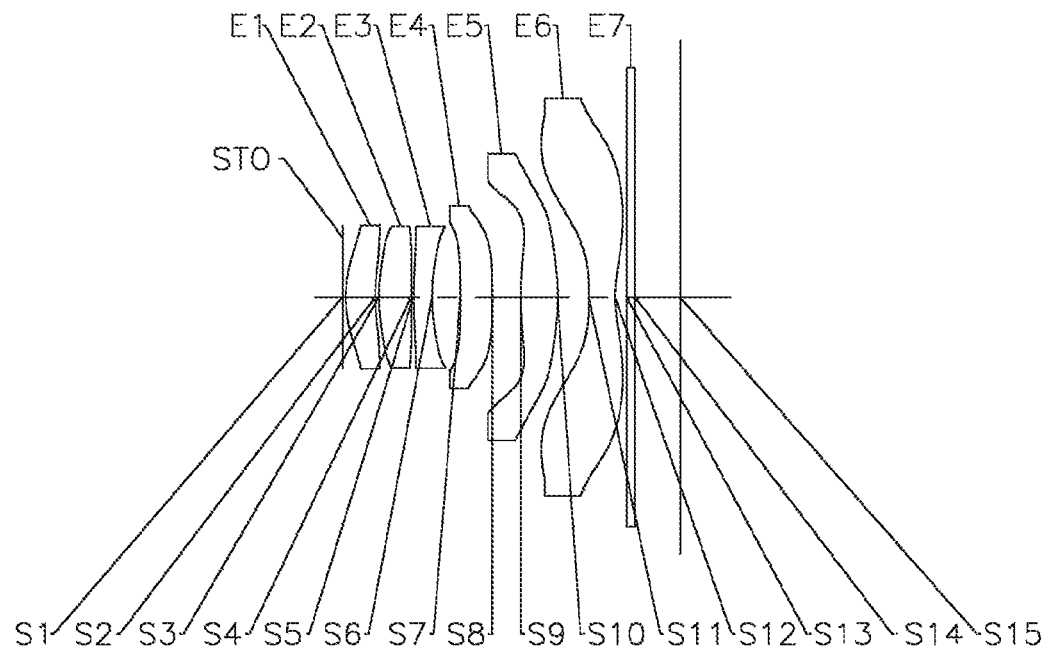
FIG. 5 is a schematic structural view of a camera lens assembly according to embodiment 3 of the present disclosure.

A camera lens assembly according to embodiment 3 of the present disclosure is described below with reference to FIG. 5 to FIG. 6D. FIG. 5 is a schematic structural view of the camera lens assembly according to embodiment 3 of the present disclosure.

As shown in FIG. 5, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 3, a total effective focal length of the camera lens assembly satisfies f=3.68 mm, a distance along the optical axis from the object-side surface S1 of the first lens E1 to the image plane S15. satisfies TTL=4.46 mm, and a maximal field-of-view of the camera lens assembly FOV=83.0°.

Table 5 is a table showing basic parameters of the camera lens assembly of embodiment 3, wherein the units for the radius of curvature, the thickness and focal length are millimeter (mm). Table 6 below shows high-order coefficients applicable to each aspheric surface S1-S12 in embodiment 3, wherein the surface shape of each aspheric surface can be defined by the formula (1) given in the above embodiment 1.

TABLE 5

| Surface number | Surface type | Radius of curvature | Thickness/Distance | Material Refractive index | Material Abbe number | Focal length | Conic coefficient |
|---|---|---|---|---|---|---|---|
| OBJ | spherical | infinite | infinite | | | | |
| STO | spherical | infinite | 0.0400 | | | | |
| S1 | aspheric | 1.7201 | 0.3933 | 1.54 | 56.1 | 8.77 | −15.6760 |
| S2 | aspheric | 2.4676 | 0.0510 | | | | 0.1115 |
| S3 | aspheric | 2.5916 | 0.4279 | 1.54 | 56.1 | 5.80 | −1.6790 |
| S4 | aspheric | 13.4825 | 0.0300 | | | | 8.9446 |
| S5 | aspheric | 4.2382 | 0.2500 | 1.67 | 19.2 | −12.99 | −10.2470 |
| S6 | aspheric | 2.7924 | 0.3779 | | | | 5.4739 |
| S7 | aspheric | −150.0000 | 0.4269 | 1.54 | 56.1 | 100.00 | 99.0000 |
| S8 | aspheric | −40.0625 | 0.3796 | | | | −99.0000 |
| S9 | aspheric | 4.8060 | 0.4909 | 1.56 | 44.9 | 3.45 | 0.0000 |
| S10 | aspheric | −3.1687 | 0.4173 | | | | −11.1695 |
| S11 | aspheric | −5.5558 | 0.3490 | 1.54 | 56.1 | −2.37 | 3.5392 |
| S12 | aspheric | 1.7240 | 0.1560 | | | | −9.0818 |
| S13 | spherical | infinite | 0.1100 | 1.52 | 64.2 | | |
| S14 | spherical | infinite | 0.6002 | | | | |
| S15 | spherical | infinite | | | | | |

TABLE 6

| Surface number | A4 | A6 | A8 | A10 | A12 | A14 | A16 | A18 | A20 |
|---|---|---|---|---|---|---|---|---|---|
| S1 | 3.2070E−01 | −7.1844E−01 | 9.4019E−01 | 3.9402E−01 | −5.6243E+00 | 1.2609E+01 | −1.4010E+01 | 8.0059E+00 | −1.8757E+00 |
| S2 | −1.5430E−01 | −2.8380E−01 | 1.1725E+00 | −5.5915E+00 | 1.8406E+01 | −3.3523E+01 | 3.4207E+01 | −1.8663E+01 | 4.2786E+00 |
| S3 | −6.2680E−02 | −1.6801E−01 | 6.4972E−01 | −3.3927E+00 | 1.3040E+01 | −2.4591E+01 | 2.4515E+01 | −1.2703E+01 | 2.7235E+00 |
| S4 | −1.2246E−01 | 2.5224E−01 | −1.0996E+00 | 2.2070E+00 | −3.7010E−01 | −4.8090E+00 | 7.6531E+00 | −5.1459E+00 | 1.3786E+00 |
| S5 | −1.5617E−01 | 3.2522E−01 | −1.5465E+00 | 4.1232E+00 | −5.9444E+00 | 5.0116E+00 | −2.4672E+00 | 5.8027E−01 | 0.0000E+00 |
| S6 | −8.1665E−02 | 8.9504E−02 | −2.9705E−01 | 5.3183E−01 | −4.1069E−01 | 7.5638E−02 | 6.4965E−02 | −1.0847E−02 | 0.0000E+00 |
| S7 | −1.5660E−01 | 3.0420E−01 | −1.5133E+00 | 5.2080E+00 | −1.2003E+01 | 1.7596E+01 | −1.5806E+01 | 7.9182E+00 | −1.6847E+00 |
| S8 | −1.9237E−01 | 1.5957E−01 | −6.4938E−01 | 1.9570E+00 | −3.7983E+00 | 4.5659E+00 | −3.2894E+00 | 1.3001E+00 | −2.1508E−01 |
| S9 | −6.6487E−03 | −1.5853E−01 | 3.0009E−01 | −4.5596E−01 | 4.0720E−01 | −2.3802E−01 | 8.9396E−02 | −1.8629E−02 | 1.5857E−03 |
| S10 | 9.4052E−02 | −1.9431E−01 | 2.9865E−01 | −3.2766E−01 | 2.4671E−01 | −7.2462E−02 | 1.4508E−02 | −1.5270E−03 | 6.5134E−05 |
| S11 | −2.6949E−01 | 1.6692E−01 | −4.3927E−02 | 4.9893E−03 | 5.1716E−04 | −3.1777E−04 | 5.8790E−05 | −5.3577E−06 | 1.9964E−07 |
| S12 | −1.7252E−01 | 1.3109E−01 | −7.4298E−02 | 3.0168E−02 | −8.3518E−03 | 1.4948E−03 | −1.6382E−04 | 9.9912E−06 | −2.6030E−07 |

Figures 6A, 6B:
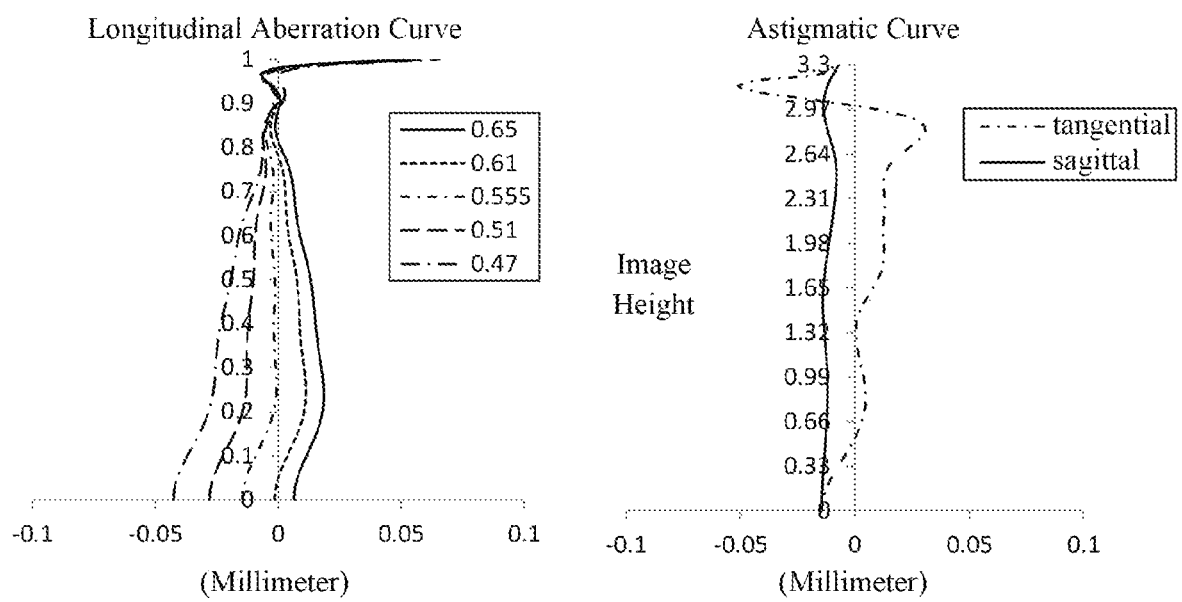
FIG. 6A illustrates a longitudinal aberration curve of the camera lens assembly according to embodiment 3.
FIG. 6B illustrates an astigmatic curve of the camera lens assembly according to embodiment 3.

FIG. 6A illustrates a longitudinal aberration curve of the camera lens assembly according to embodiment 3, representing deviations of focal points converged by light of different wavelengths after passing through the camera lens assembly. FIG. 6B illustrates an astigmatic curve of the camera lens assembly according to embodiment 3, representing a curvature of a tangential plane and a curvature of a sagittal plane. FIG. 6C illustrates a distortion curve of the camera lens assembly according to embodiment 3, representing amounts of distortion corresponding to different image heights. FIG. 6D illustrates a lateral color curve of the camera lens assembly according to embodiment 3, representing deviations of different image heights on an image plane after light passes through the camera lens assembly. It can be seen from FIG. 6A to FIG. 6D that the camera lens assembly provided in embodiment 3 can achieve a good imaging quality.

Embodiment 4

A camera lens assembly according to embodiment 4 of the present disclosure is described below with reference to FIG. 1 to FIG. 8D. FIG. 7 is a schematic structural view of the camera lens assembly according to embodiment 4 of the present disclosure.

As shown in FIG. 7, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 4, a total effective focal length of the camera lens assembly satisfies f=3.57 mm, a distance along the optical axis from the object-side surface S1 of the first lens E1 to the image plane S15. satisfies TTL=4.41 mm, and a maximal field-of-view of the camera lens assembly FOV=83.9°.

Table 7 is a table showing basic parameters of the camera lens assembly of embodiment 4, wherein the units for the radius of curvature, the thickness and focal length are millimeter (mm). Table 8 below shows high-order coefficients applicable to each aspheric surface S1-S12 in embodiment 4, wherein the surface shape of each aspheric surface can be defined by the formula (1) given in the above embodiment 1.

can be seen from FIG. 8A to FIG. 8D that the camera lens assembly provided in embodiment 4 can achieve a good imaging quality.

Embodiment 5

Figure 9:
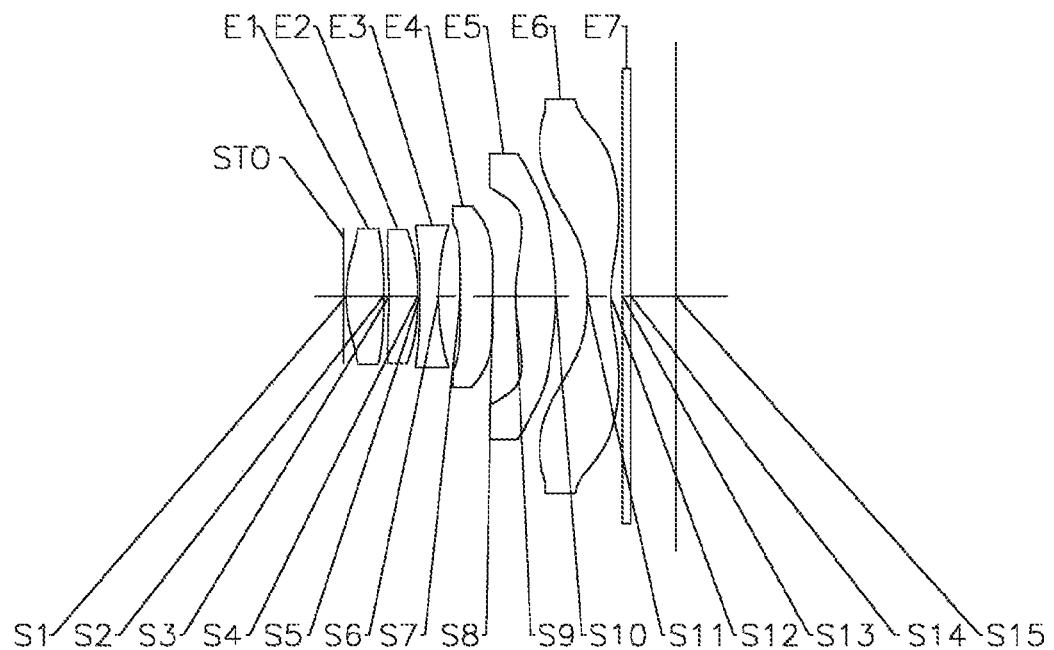
FIG. 9 is a schematic structural view of a camera lens assembly according to embodiment 5 of the present disclosure.

A camera lens assembly according to embodiment 5 of the present disclosure is described below with reference to FIG. 9 to FIG. 10D. FIG. 9 is a schematic structural view of the camera lens assembly according to embodiment 5 of the present disclosure.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | 0.0400 | | | | |
| S1 | aspheric | 1.7297 | 0.3892 | 1.54 | 56.1 | 8.27 | −23.5029 |
| S2 | aspheric | 2.5820 | 0.0574 | | | | −1.3187 |
| S3 | aspheric | 2.6232 | 0.4672 | 1.54 | 56.1 | 7.08 | −0.8832 |
| S4 | aspheric | 7.6521 | 0.0300 | | | | 48.9820 |
| S5 | aspheric | 3.3175 | 0.2476 | 1.67 | 19.2 | 99.82 | −19.0784 |
| S6 | aspheric | 3.3835 | 0.3121 | | | | 7.5021 |
| S7 | aspheric | −8.6846 | 0.4894 | 1.54 | 56.1 | −9.53 | −99.0000 |
| S8 | aspheric | 13.2283 | 0.1755 | | | | −99.0000 |
| S9 | aspheric | 2.2756 | 0.7876 | 1.56 | 44.9 | 3.60 | −16.4992 |
| S10 | aspheric | −16.9229 | 0.3534 | | | | 33.2760 |
| S11 | aspheric | −5.5742 | 0.3000 | 1.54 | 56.1 | −2.92 | 3.8390 |
| S12 | aspheric | 2.2697 | 0.1139 | | | | −7.6068 |
| S13 | spherical | infinite | 0.1100 | 1.52 | 64.2 | | |
| S14 | spherical | infinite | 0.5799 | | | | |
| S15 | spherical | infinite | | | | | |

TABLE 8

| Surface number | A4 | A6 | A8 | A10 | A12 | A14 | A16 | A18 | A20 |
|---|---|---|---|---|---|---|---|---|---|
| S1 | 4.7226E−01 | −1.7110E+00 | 5.0193E+00 | −1.2195E+01 | 2.0957E+01 | −2.4382E+01 | 1.8282E+01 | −7.9615E+00 | 1.5282E+00 |
| S2 | −2.0965E−01 | −5.7297E−02 | −1.9646E−01 | 6.2820E−01 | 1.5195E+00 | −6.3107E+00 | 8.0576E+00 | −4.6696E+00 | 1.0539E+00 |
| S3 | −1.1240E−01 | 1.1627E−01 | −7.4538E−01 | 2.8170E+00 | −2.9938E+00 | −6.9208E−01 | 3.5946E+00 | −2.5568E+00 | 5.9538E−01 |
| S4 | −4.2001E−01 | 8.2770E−01 | −1.8080E+00 | 4.0919E+00 | −6.0746E+00 | 5.1427E+00 | −2.4683E+00 | 6.8581E−01 | −1.1397E−01 |
| S5 | −3.0472E−01 | 5.1852E−01 | −1.3859E+00 | 3.6535E+00 | −5.7491E+00 | 4.9476E+00 | −2.1192E+00 | 3.4301E−01 | 0.0000E+00 |
| S6 | −3.1632E−02 | −4.8582E−02 | −7.9741E−02 | 7.1011E−01 | −1.6134E+00 | 2.1329E+00 | −1.5587E+00 | 5.1629E−01 | 0.0000E+00 |
| S7 | −1.4765E−01 | 5.9456E−01 | −2.6775E+00 | 8.7500E+00 | −2.0034E+01 | 3.0408E+01 | −2.9043E+01 | 1.5787E+01 | −3.7190E+00 |
| S8 | −4.4546E−01 | 7.9436E−01 | −1.6460E+00 | 2.8684E+00 | −3.8368E+00 | 3.6485E+00 | −2.2919E+00 | 8.5070E−01 | −1.3979E−01 |
| S9 | −1.9082E−01 | 2.1565E−01 | −6.4758E−01 | 1.3666E+00 | −2.0675E+00 | 2.0511E+00 | −1.2767E+00 | 4.4788E−01 | −6.6198E−02 |
| S10 | 1.3349E−02 | −1.0596E−01 | 1.0468E−01 | −5.6587E−02 | 1.7026E−02 | −1.9416E−03 | −2.8678E−04 | 1.0081E−04 | −7.7239E−06 |
| S11 | −2.7229E−01 | 7.6686E−02 | 1.0175E−01 | −8.9553E−02 | 3.4133E−02 | −7.4785E−03 | 9.7599E−04 | −7.0822E−05 | 2.2080E−06 |
| S12 | −2.1072E−01 | 1.4299E−01 | −6.0792E−02 | 1.7499E−02 | −3.4671E−03 | 4.6320E−04 | −3.9813E−05 | 2.0094E−06 | −4.6373E−08 |

Figure 8A:
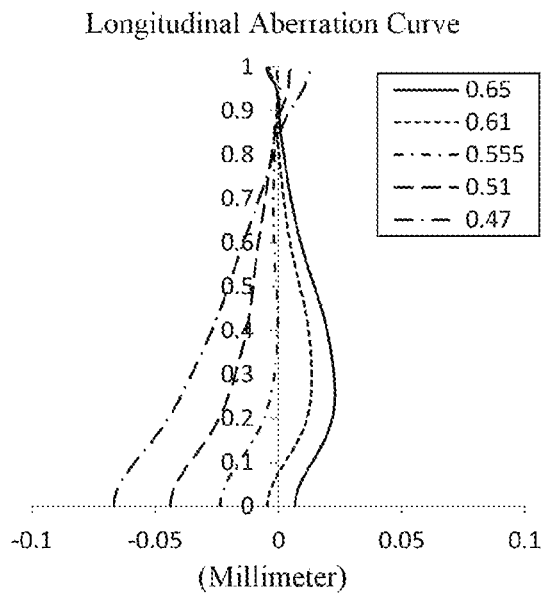
FIG. 8A illustrates a longitudinal aberration curve of the camera lens assembly according to embodiment 4.
Figure 8B:
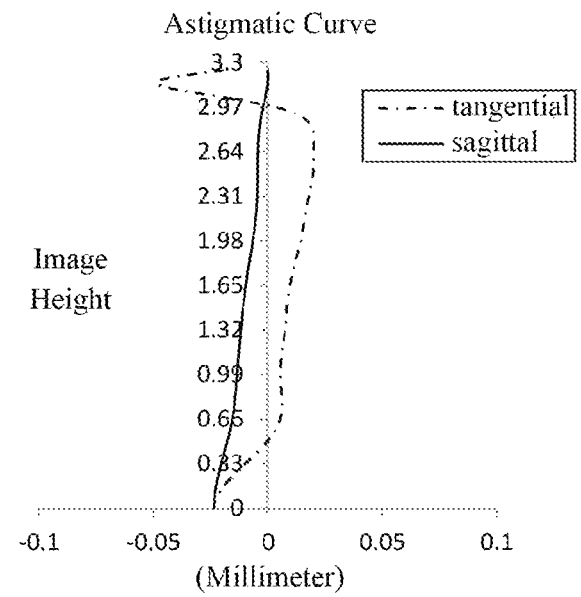
FIG. 8B illustrates an astigmatic curve of the camera lens assembly according to embodiment 4.
Figure 8C:
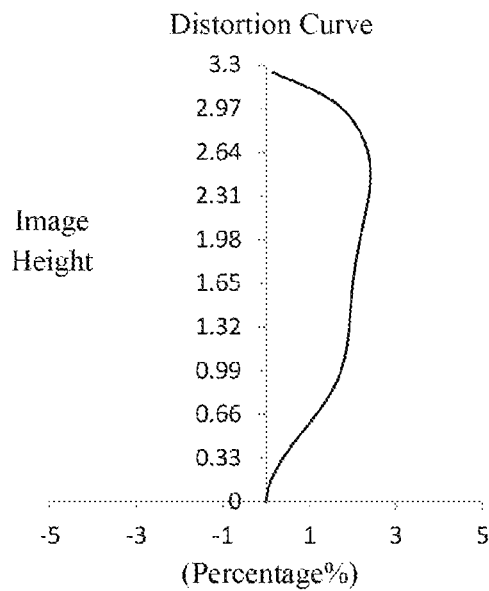
FIG. 8C illustrates a distortion curve of the camera lens assembly according to embodiment 4.
Figure 8D:
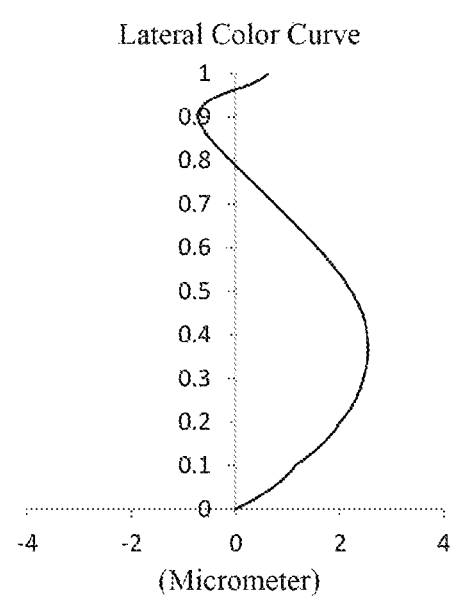
FIG. 8D illustrates a lateral color curve of the camera lens assembly according to embodiment 4.

FIG. 8A illustrates a longitudinal aberration curve of the camera lens assembly according to embodiment 4, representing deviations of focal points converged by light of different wavelengths after passing through the camera lens assembly. FIG. 8B illustrates an astigmatic curve of the camera lens assembly according to embodiment 4, representing a curvature of a tangential plane and a curvature of a sagittal plane. FIG. 8C illustrates a distortion curve of the camera lens assembly according to embodiment 4, representing amounts of distortion corresponding to different image heights. FIG. 8D illustrates a lateral color curve of the camera lens assembly according to embodiment 4, representing deviations of different image heights on an image plane after light passes through the camera lens assembly. It As shown in FIG. 9, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a convex surface. The second lens E2 has a positive refractive power, and an object-side surface S3 thereof is a concave surface, and an image-side surface S4 thereof is a convex surface. The third lens E3 has a negative refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 5, a total effective focal length of the camera lens assembly satisfies f=3.48 mm, a distance along the optical axis from the object-side surface S1 of the first lens E1 to the image plane S15. satisfies TTL=4.38 mm, and a maximal field-of-view of the camera lens assembly FOV=86.1°.

Table 9 is a table showing basic parameters of the camera lens assembly of embodiment 5, wherein the units for the radius of curvature, the thickness and focal length are millimeter (mm). Table 10 below shows high-order coefficients applicable to each aspheric surface S1-S12 in embodiment 5, wherein the surface shape of each aspheric surface can be defined by the formula (1) given in the above embodiment 1.

Figures 10A, 10B:
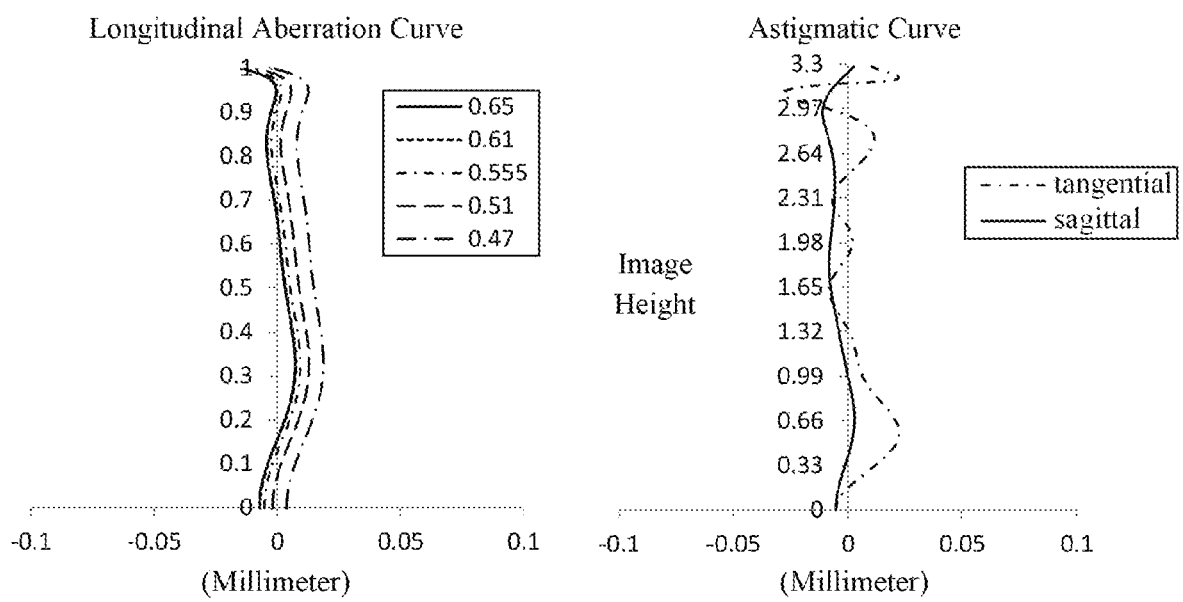
FIG. 10A illustrates a longitudinal aberration curve of the camera lens assembly according to embodiment 5.
FIG. 10B illustrates an astigmatic curve of the camera lens assembly according to embodiment 5.
Figure 10C:
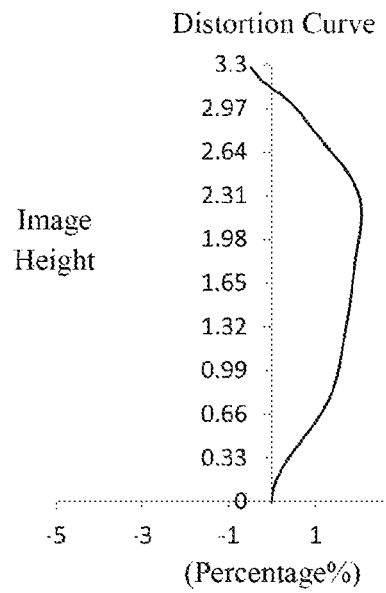
FIG. 10C illustrates a distortion curve of the camera lens assembly according to embodiment 5.
Figure 10D:
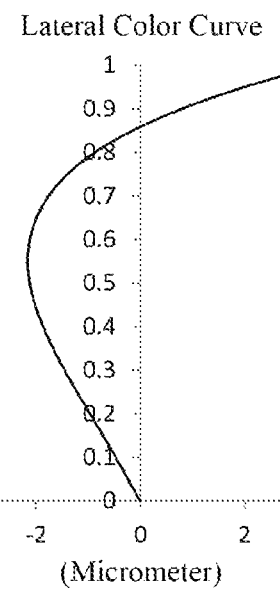
FIG. 10D illustrates a lateral color curve of the camera lens assembly according to embodiment 5.

FIG. 10A illustrates a longitudinal aberration curve of the camera lens assembly according to embodiment 5, representing deviations of focal points converged by light of different wavelengths after passing through the camera lens assembly. FIG. 10B illustrates an astigmatic curve of the camera lens assembly according to embodiment 5, representing a curvature of a tangential plane and a curvature of a sagittal plane. FIG. 10C illustrates a distortion curve of the camera lens assembly according to embodiment 5, representing amounts of distortion corresponding to different image heights. FIG. 10D illustrates a lateral color curve of the camera lens assembly according to embodiment 5, representing deviations of different image heights on an image plane after light passes through the camera lens assembly. It can be seen from FIG. 10A to FIG. 10D that the camera lens assembly provided in embodiment 5 can achieve a good imaging quality.

Embodiment 6

Figure 11:
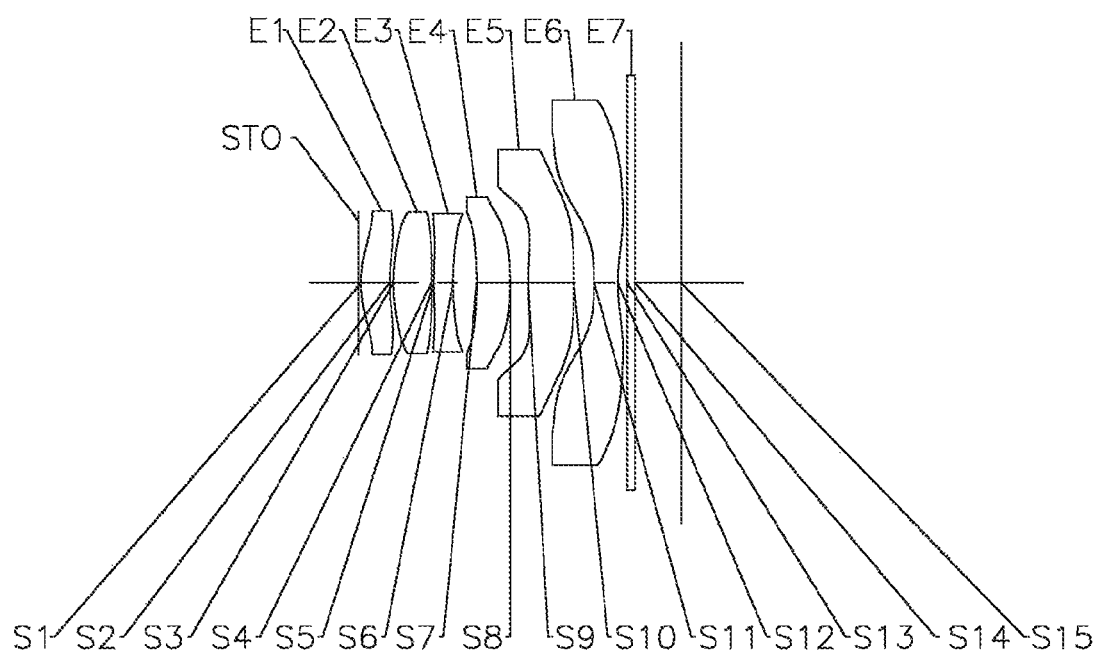
FIG. 11 is a schematic structural view of a camera lens assembly according to embodiment 6 of the present disclosure.

A camera lens assembly according to embodiment 6 of the present disclosure is described below with reference to FIG. 11 to FIG. 12D. FIG. 11 is a schematic structural view of the camera lens assembly according to embodiment 6 of the present disclosure.

As shown in FIG. 11, the camera lens assembly includes, sequentially from an object side to an image side along an optical axis: a stop STO, a first lens E1, a second lens E2, a

TABLE 9

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | 0.0400 | | | | |
| S1 | aspheric | 1.9326 | 0.4950 | 1.55 | 51.1 | 3.46 | −0.6309 |
| S2 | aspheric | −120.0000 | 0.0723 | | | | 99.0000 |
| S3 | aspheric | −20.5603 | 0.3794 | 1.55 | 55.5 | 20.41 | −61.3070 |
| S4 | aspheric | −7.2664 | 0.0300 | | | | −13.8306 |
| S5 | aspheric | 10.8835 | 0.2500 | 1.66 | 20.4 | −6.84 | 95.1124 |
| S6 | aspheric | 3.1700 | 0.2907 | | | | 5.8300 |
| S7 | aspheric | 20.1885 | 0.4285 | 1.61 | 28.4 | −15.79 | −44.1994 |
| S8 | aspheric | 6.4794 | 0.3024 | | | | 12.1440 |
| S9 | aspheric | 2.3184 | 0.5359 | 1.56 | 42.7 | 2.61 | −12.4999 |
| S10 | aspheric | −3.7098 | 0.4174 | | | | −16.8121 |
| S11 | aspheric | −5.6196 | 0.3138 | 1.54 | 56.1 | −2.33 | 3.5215 |
| S12 | aspheric | 1.6791 | 0.1579 | | | | −10.4313 |
| S13 | spherical | infinite | 0.1100 | 1.52 | 64.2 | | |
| S14 | spherical | infinite | 0.6000 | | | | |
| S15 | spherical | infinite | | | | | |

TABLE 10

| Surface number | A4 | A6 | A8 | A10 | A12 | A14 | A16 | A18 | A20 |
|---|---|---|---|---|---|---|---|---|---|
| S1 | −4.5520E−02 | −4.3748E−03 | −1.5183E−01 | 1.9069E−01 | −1.7732E−01 | 8.3765E−02 | 0.0000E+00 | 0.0000E+00 | 0.0000E+00 |
| S2 | −2.0018E−01 | 2.0543E−01 | −1.2823E−01 | 5.7296E−02 | −1.5551E−02 | 0.0000E+00 | 0.0000E+00 | 0.0000E+00 | 0.0000E+00 |
| S3 | −1.7357E−01 | 4.1451E−01 | −3.3510E−01 | 2.4189E−01 | −1.3967E−01 | 0.0000E+00 | 0.0000E+00 | 0.0000E+00 | 0.0000E+00 |
| S4 | −6.2061E−01 | 2.9842E+00 | −1.0319E+01 | 2.3655E+01 | −3.5569E+01 | 3.3499E+01 | −1.7862E+01 | 4.0960E+00 | 0.0000E+00 |
| S5 | −6.1138E−01 | 2.7204E+00 | −9.8353E+00 | 2.3162E+01 | −3.5085E+01 | 3.3294E+01 | −1.7935E+01 | 4.1728E+00 | 0.0000E+00 |
| S6 | −1.5850E−01 | 5.2343E−01 | −1.6568E+00 | 3.3143E+00 | −4.0431E+00 | 3.0377E+00 | −1.3120E+00 | 2.6269E−01 | 0.0000E+00 |
| S7 | −2.6874E−01 | 8.6842E−01 | −3.1632E+00 | 9.0909E+00 | −1.8950E+01 | 2.6435E+01 | −2.3240E+01 | 1.1583E+01 | −2.4968E+00 |
| S8 | −4.3705E−01 | 8.2415E−01 | −1.9525E+00 | 3.7375E+00 | −5.1842E+00 | 4.8079E+00 | −2.7814E+00 | 8.9590E−01 | −1.2076E−01 |
| S9 | −8.7849E−02 | 1.1326E−01 | −2.3606E−01 | 3.7293E−01 | −4.6332E−01 | 3.5196E−01 | −1.5805E−01 | 3.8685E−02 | −3.9039E−03 |
| S10 | 2.1067E−02 | −8.4602E−02 | 2.2674E−01 | −2.6911E−01 | 1.5527E−01 | −4.7816E−02 | 7.8459E−03 | −6.0513E−04 | 1.3495E−05 |
| S11 | −3.7798E−01 | 3.6379E−01 | −2.0521E−01 | 8.1543E−02 | −2.2269E−02 | 4.0075E−03 | −4.5053E−04 | 2.8598E−05 | −7.8123E−07 |
| S12 | −1.7495E−01 | 1.4778E−01 | −8.5704E−02 | 3.3142E−02 | −8.5335E−03 | 1.4350E−03 | −1.5240E−04 | 9.4077E−06 | −2.6008E−07 | third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a positive refractive power, and an object-side surface S7 thereof is a concave surface, and an image-side surface S8 thereof is a convex surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 6, a total effective focal length of the camera lens assembly satisfies f=3.35 mm, a distance along the optical axis from the object-side surface S1 of the first lens E1 to the image plane S15. satisfies TTL=4.06 mm, and a maximal field-of-view of the camera lens assembly FOV=81.4°.

Table 11 is a table showing basic parameters of the camera lens assembly of embodiment 6, wherein the units for the radius of curvature, the thickness and focal length are millimeter (mm). Table 12 below shows high-order coefficients applicable to each aspheric surface S1-S12 in embodiment 6, wherein the surface shape of each aspheric surface can be defined by the formula (1) given in the above embodiment 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | 0.0360 | | | | |
| S1 | aspheric | 1.6000 | 0.3611 | 1.54 | 56.1 | 9.10 | −24.5737 |
| S2 | aspheric | 2.1728 | 0.0500 | | | | −1.1694 |
| S3 | aspheric | 2.3105 | 0.4812 | 1.54 | 56.1 | 5.60 | −1.5498 |
| S4 | aspheric | 8.7892 | 0.0300 | | | | 49.5062 |
| S5 | aspheric | 3.5344 | 0.2457 | 1.67 | 19.2 | 149.97 | −25.7632 |
| S6 | aspheric | 3.5589 | 0.3008 | | | | 7.1255 |
| S7 | aspheric | −6.2984 | 0.4208 | 1.54 | 56.1 | 50.00 | −38.1984 |
| S8 | aspheric | −5.2382 | 0.2293 | | | | −99.0000 |
| S9 | aspheric | 3.5642 | 0.5811 | 1.56 | 44.9 | 5.24 | −21.5785 |
| S10 | aspheric | −16.6701 | 0.2590 | | | | 77.0687 |
| S11 | aspheric | −4.6930 | 0.3000 | 1.54 | 56.1 | −2.53 | 0.0000 |
| S12 | aspheric | 2.0051 | 0.1217 | | | | −1.0000 |
| S13 | spherical | infinite | 0.0990 | 1.52 | 64.2 | | |
| S14 | spherical | infinite | 0.5844 | | | | |
| S15 | spherical | infinite | | | | | |

TABLE 12

| Surface number | A4 | A6 | A8 | A10 | A12 | A14 | A16 | A18 | A20 |
|---|---|---|---|---|---|---|---|---|---|
| S1 | 6.1519E−01 | −2.6576E+00 | 8.7883E+00 | −2.3393E+01 | 4.3478E+01 | −5.4343E+01 | 4.3932E+01 | −2.0880E+01 | 4.4556E+00 |
| S2 | −2.2856E−01 | −3.1243E−01 | −2.7518E−01 | 2.2760E+00 | 1.7020E+00 | −1.6276E+01 | 2.6359E+01 | −1.8397E+01 | 4.9439E+00 |
| S3 | −8.4427E−02 | −1.1527E−02 | −1.3787E+00 | 6.3743E+00 | −6.3499E+00 | −7.5747E+00 | 2.1157E+01 | −1.6936E+01 | 4.8337E+00 |
| S4 | −4.9265E−01 | 7.4043E−01 | 2.9096E−01 | −5.1701E+00 | 1.7632E+01 | −3.4141E+01 | 3.7541E+01 | −2.1752E+01 | 5.2025E+00 |
| S5 | −4.2609E−01 | 4.9236E−01 | −9.4064E−02 | −1.3920E−01 | 5.0901E−03 | −5.5155E−01 | 1.2332E+00 | −5.9515E−01 | 0.0000E+00 |
| S6 | −7.7528E−02 | −5.7945E−02 | −8.4603E−02 | 2.4915E+00 | −8.8777E+00 | 1.5577E+01 | −1.3713E+01 | 5.0233E+00 | 0.0000E+00 |
| S7 | −1.2082E−01 | 6.3443E−01 | −4.8380E+00 | 2.2113E+01 | −6.5579E+01 | 1.2389E+02 | −1.4416E+02 | 9.4270E+01 | −2.6461E+01 |
| S8 | −3.3528E−01 | 3.1155E−01 | −2.9828E−02 | −1.1755E+00 | 2.8343E+00 | −3.2024E+00 | 1.7060E+00 | −1.9239E−01 | −1.0073E−01 |
| S9 | −2.0412E−01 | 4.7263E−02 | −2.6190E−01 | 7.3679E−01 | −1.5052E+00 | 1.8661E+00 | −1.4507E+00 | 6.5653E−01 | −1.2639E−01 |
| S10 | −1.2281E−02 | −2.1601E−01 | 2.3145E−01 | −6.1312E−02 | −7.9163E−02 | 8.8011E−02 | −3.8297E−02 | 7.9674E−03 | −6.5307E−04 |
| S11 | −3.4707E−01 | 4.8151E−02 | 3.4261E−01 | −3.4680E−01 | 1.6842E−01 | −4.7538E−02 | 7.8649E−03 | −6.9488E−04 | 2.4325E−05 |
| S12 | −3.7733E−01 | 3.0915E−01 | −1.6055E−01 | 5.2130E−02 | −9.9395E−03 | 8.1047E−04 | 5.4205E−05 | −1.5976E−05 | 9.0053E−07 |

Figure 12A:
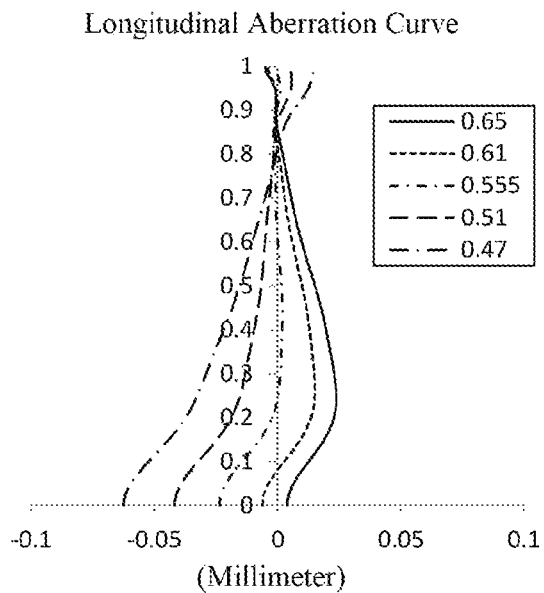
FIG. 12A illustrates a longitudinal aberration curve of the camera lens assembly according to embodiment 6.
Figure 12B:
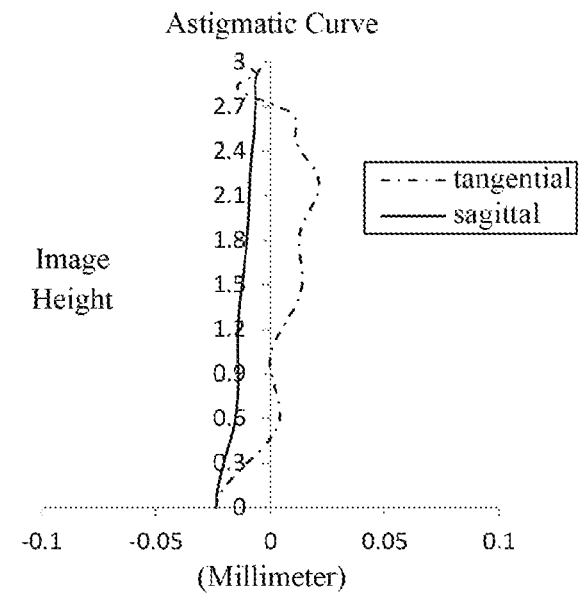
FIG. 12B illustrates an astigmatic curve of the camera lens assembly according to embodiment 6.
Figure 12C:
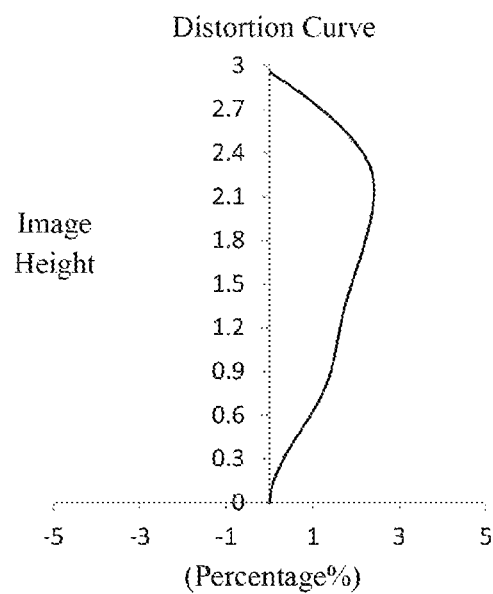
FIG. 12C illustrates a distortion curve of the camera lens assembly according to embodiment 6.
Figure 12D:
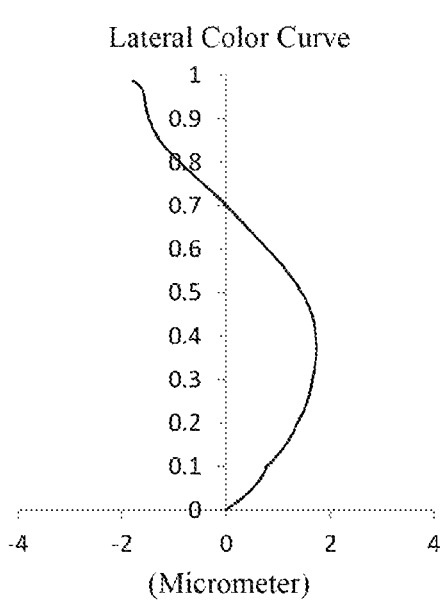
FIG. 12D illustrates a lateral color curve of the camera lens assembly according to embodiment 6.

FIG. 12A illustrates a longitudinal aberration curve of the camera lens assembly according to embodiment 6, representing deviations of focal points converged by light of different wavelengths after passing through the camera lens assembly. FIG. 12B illustrates an astigmatic curve of the camera lens assembly according to embodiment 6, representing a curvature of a tangential plane and a curvature of a sagittal plane. FIG. 12C illustrates a distortion curve of the camera lens assembly according to embodiment 6, representing amounts of distortion corresponding to different image heights. FIG. 12D illustrates a lateral color curve of the camera lens assembly according to embodiment 6, representing deviations of different image heights on an image plane after light passes through the camera lens assembly. It can be seen from FIG. 12A to FIG. 12D that the camera lens assembly provided in embodiment 6 can achieve a good imaging quality.

Embodiment 7

Figure 13:
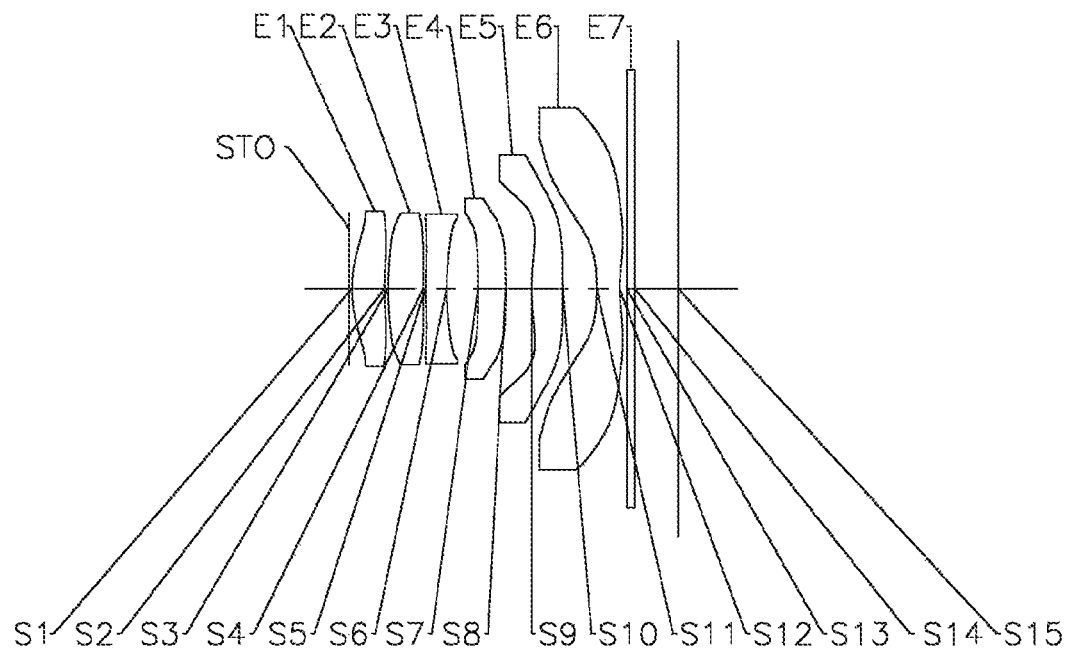
FIG. 13 is a schematic structural view of a camera lens assembly according to embodiment 7 of the present disclosure.

A camera lens assembly according to embodiment 7 of the present disclosure is described below with reference to FIG. 13 to FIG. 14D. FIG. 13 is a schematic structural view of the camera lens assembly according to embodiment 7 of the present disclosure.

As shown in FIG. 13, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a positive refractive power, and an object-side surface S7 thereof is a convex surface, and an image-side surface S8 thereof is a convex surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 7, a total effective focal length of the camera lens assembly satisfies f=3.70 mm, a distance along the optical axis from the object-side surface S1 of the first lens E1 to the image plane S15. satisfies TTL=4.26 mm, and a maximal field-of-view of the camera lens assembly FOV=79.9°.

Table 13 is a table showing basic parameters of the camera lens assembly of embodiment 7, wherein the units for the radius of curvature, the thickness and focal length are millimeter (mm). Table 14 below shows high-order coefficients applicable to each aspheric surface S1-S12 in embodiment 7, wherein the surface shape of each aspheric surface can be defined by the formula (1) given in the above embodiment 1.

TABLE 13

| Surface number | Surface type | Radius of curvature | Thickness Distance | Material Refractive index | Abbe number | Focal length | Conic coefficient |
|---|---|---|---|---|---|---|---|
| OBJ | spherical | infinite | infinite | | | | |
| STO | spherical | infinite | 0.0382 | | | | |
| S1 | aspheric | 1.6920 | 0.4239 | 1.54 | 56.1 | 5.50 | −20.2203 |
| S2 | aspheric | 3.5326 | 0.0500 | | | | 3.8686 |
| S3 | aspheric | 3.8648 | 0.4575 | 1.54 | 56.1 | 14.00 | 2.6457 |
| S4 | aspheric | 7.4922 | 0.0300 | | | | 37.2456 |
| S5 | aspheric | 3.6972 | 0.2761 | 1.67 | 19.2 | −75.01 | −22.5611 |
| S6 | aspheric | 3.3426 | 0.4079 | | | | 4.5546 |
| S7 | aspheric | 65.0842 | 0.3629 | 1.54 | 56.1 | 89.99 | −99.0000 |
| S8 | aspheric | −200.0000 | 0.3413 | | | | 99.0000 |
| S9 | aspheric | 3.2844 | 0.4060 | 1.56 | 44.9 | 4.93 | −7.2004 |
| S10 | aspheric | −17.9017 | 0.4430 | | | | 76.5289 |
| S11 | aspheric | −4.4730 | 0.3000 | 1.54 | 56.1 | −2.44 | −0.0150 |
| S12 | aspheric | 1.9390 | 0.0948 | | | | −0.9607 |
| S13 | spherical | infinite | 0.1050 | 1.52 | 64.2 | | |
| S14 | spherical | infinite | 0.5636 | | | | |
| S15 | spherical | infinite | | | | | |

TABLE 14

| Surface number | A4 | A6 | A8 | A10 | A12 | A14 | A16 | A18 | A20 |
|---|---|---|---|---|---|---|---|---|---|
| S1 | 4.3861E−01 | −1.3843E+00 | 3.3844E+00 | −6.7926E+00 | 9.3150E+00 | −8.4576E+00 | 5.0863E+00 | −1.9258E+00 | 3.5769E−01 |
| S2 | −1.8382E−01 | −2.3998E−01 | −1.9251E−01 | 2.7374E+00 | −4.8959E+00 | 3.3553E+00 | −2.0774E−01 | −8.5223E−01 | 3.1562E−01 |
| S3 | −7.1435E−02 | −8.9155E−02 | −5.9361E−01 | 4.0035E+00 | −6.1160E+00 | 2.3463E+00 | 2.7121E+00 | −3.0487E+00 | 8.8888E−01 |
| S4 | −3.6386E−01 | 5.3170E−01 | −2.8107E−01 | −8.9914E−01 | 3.7190E+00 | −7.1188E+00 | 7.1920E+00 | −3.6844E+00 | 7.6327E−01 |
| S5 | −3.5343E−01 | 3.9325E−01 | −6.0346E−02 | −5.0004E−01 | 1.2160E+00 | −1.7518E+00 | 1.3597E+00 | −3.9992E−01 | 0.0000E+00 |
| S6 | −1.2255E−01 | 1.0238E−01 | −4.0207E−01 | 2.3470E+00 | −6.4046E+00 | 9.5844E+00 | −7.5049E+00 | 2.4686E+00 | 0.0000E+00 |

TABLE 14-continued

| Surface number | A4 | A6 | A8 | A10 | A12 | A14 | A16 | A18 | A20 |
|---|---|---|---|---|---|---|---|---|---|
| S7 | −1.3144E−01 | 1.5073E−01 | −1.6238E+00 | 7.6618E+00 | −2.1279E+01 | 3.5527E+01 | −3.5405E+01 | 1.9406E+01 | −4.4920E+00 |
| S8 | −1.5914E−01 | −1.4439E−01 | 3.6794E−01 | −1.0715E−01 | −1.2714E+00 | 2.8404E+00 | −2.8224E+00 | 1.3976E+00 | −2.7684E−01 |
| S9 | −1.7312E−02 | −3.2563E−01 | 2.6278E−01 | 2.7058E−01 | −9.9618E−01 | 1.1137E+00 | −6.3174E−01 | 1.8595E−01 | −2.2595E−02 |
| S10 | 7.1347E−02 | −4.4214E−01 | 5.7220E−01 | −3.7700E−01 | 1.0854E−01 | 1.1524E−02 | −1.6827E−02 | 4.2591E−03 | −3.6544E−04 |
| S11 | −4.6304E−01 | 7.9271E−03 | 7.6164E−01 | −8.9950E−01 | 5.1977E−01 | −1.7435E−01 | 3.4556E−02 | −3.7654E−03 | 1.7429E−04 |
| S12 | −5.2552E−01 | 4.5763E−01 | −2.2362E−01 | 6.0273E−02 | −7.0041E−03 | −5.9069E−04 | 2.9645E−04 | −3.5373E−05 | 1.4827E−06 |

Figure 14A:
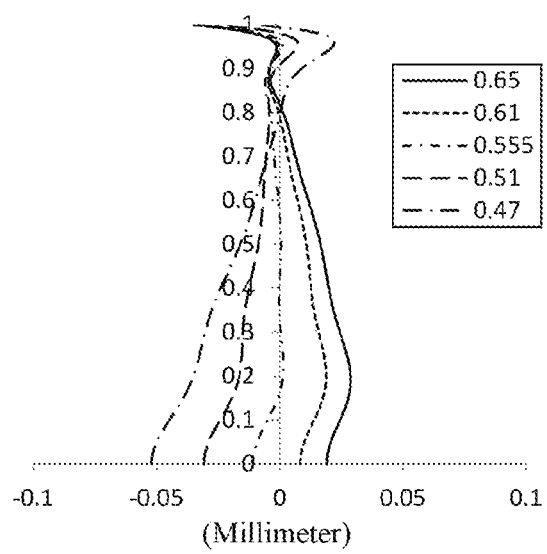
FIG. 14A illustrates a longitudinal aberration curve of the camera lens assembly according to embodiment 7.
Figure 14B:
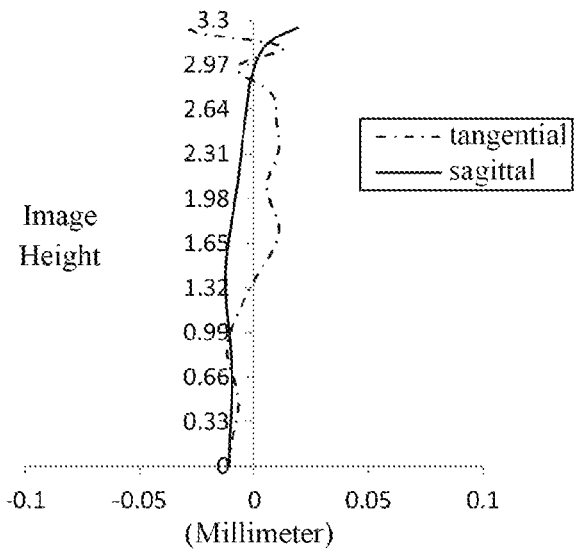
FIG. 14B illustrates an astigmatic curve of the camera lens assembly according to embodiment 7.

FIG. 14A illustrates a longitudinal aberration curve of the camera lens assembly according to embodiment 7, representing deviations of focal points converged by light of different wavelengths after passing through the camera lens assembly. FIG. 14B illustrates an astigmatic curve of the camera lens assembly according to embodiment 7, representing a curvature of a tangential plane and a curvature of a sagittal plane. FIG. 14C illustrates a distortion curve of the camera lens assembly according to embodiment 7, representing amounts of distortion corresponding to different image heights. FIG. 14D illustrates a lateral color curve of the camera lens assembly according to embodiment 7, representing deviations of different image heights on an image plane after light passes through the camera lens assembly. It can be seen from FIG. 14A to FIG. 14D that the camera lens assembly provided in embodiment 7 can achieve a good imaging quality.

Embodiment 8

A camera lens assembly according to embodiment 8 of the present disclosure is described below with reference to FIG. 15 to FIG. 16D. FIG. 15 is a schematic structural view of the camera lens assembly according to embodiment 8 of the present disclosure.

As shown in FIG. 15, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 8, a total effective focal length of the camera lens assembly satisfies f=3.79 mm, a distance along the optical axis from the object-side surface S1 of the first lens E1 to the image plane S15. satisfies TTL=4.35 mm, and a maximal field-of-view of the camera lens assembly FOV=78.9°.

Table 15 is a table showing basic parameters of the camera lens assembly of embodiment 8, wherein the units for the radius of curvature, the thickness and focal length are millimeter (mm). Table 16 below shows high-order coefficients applicable to each aspheric surface S1-S12 in embodiment 8, wherein the surface shape of each aspheric surface can be defined by the formula (1) given in the above embodiment 1.

TABLE 15

| Surface number | Surface type | Radius of curvature | Thickness/ Distance | Material Refractive index | Material Abbe number | Focal length | Conic coefficient |
|---|---|---|---|---|---|---|---|
| OBJ | spherical | infinite | infinite | | | | |
| STO | spherical | infinite | 0.1500 | | | | |
| S1 | aspheric | 1.6583 | 0.3585 | 1.54 | 56.1 | 14.16 | −12.7550 |
| S2 | aspheric | 1.9500 | 0.0300 | | | | −5.5307 |
| S3 | aspheric | 1.9487 | 0.4970 | 1.54 | 56.1 | 3.81 | −2.8122 |
| S4 | aspheric | 27.6386 | 0.0436 | | | | −99.0000 |
| S5 | aspheric | 5.5523 | 0.2450 | 1.67 | 19.2 | −9.25 | 0.0000 |
| S6 | aspheric | 2.8922 | 0.3821 | | | | 6.8221 |
| S7 | aspheric | 24.6711 | 0.3115 | 1.57 | 37.3 | −4.22 | 0.0000 |
| S8 | aspheric | 2.1841 | 0.1625 | | | | 0.0000 |
| S9 | aspheric | 1.8479 | 0.4022 | 1.57 | 37.3 | 2.50 | 0.0000 |
| S10 | aspheric | −5.7300 | 0.8673 | | | | −99.0000 |
| S11 | aspheric | −5.4363 | 0.3479 | 1.54 | 56.1 | −2.86 | 3.6569 |
| S12 | aspheric | 2.2429 | 0.1295 | | | | −1.0000 |
| S13 | spherical | infinite | 0.1100 | 1.52 | 64.2 | | |
| S14 | spherical | infinite | 0.4630 | | | | |
| S15 | spherical | infinite | | | | | |

TABLE 16

| Surface number | A4 | A6 | A8 | A10 | A12 | A14 | A16 | A18 | A20 |
|---|---|---|---|---|---|---|---|---|---|
| S1 | 2.8672E−01 | −6.7924E−01 | 1.5319E+00 | −3.2099E+00 | 4.7666E+00 | −4.7077E+00 | 2.8405E+00 | −8.8167E−01 | 8.8870E−02 |
| S2 | −2.1136E−01 | 2.2225E−01 | −1.9115E−01 | 9.3214E−02 | −2.1765E−02 | 0.0000E+00 | 0.0000E+00 | 0.0000E+00 | 0.0000E+00 |
| S3 | −1.7142E−01 | 2.6275E−01 | −7.5842E−02 | 0.0000E+00 | 0.0000E+00 | 0.0000E+00 | 0.0000E+00 | 0.0000E+00 | 0.0000E+00 |
| S4 | −4.3814E−02 | −1.1355E−01 | 1.8171E−01 | −6.7970E−02 | 0.0000E+00 | 0.0000E+00 | 0.0000E+00 | 0.0000E+00 | 0.0000E+00 |
| S5 | −4.0214E−02 | −1.1000E−01 | −1.8889E−01 | 9.2118E−01 | −1.1873E+00 | 8.4339E−01 | −3.5973E−01 | 7.1465E−02 | 0.0000E+00 |
| S6 | −3.7176E−02 | 1.6654E−01 | −9.6132E−01 | 2.3304E+00 | −3.0646E+00 | 2.3593E+00 | −9.5942E−01 | 1.5026E−01 | 0.0000E+00 |
| S7 | −4.5581E−01 | 1.3737E+00 | −3.5688E+00 | 5.8778E+00 | −5.7087E+00 | 2.2699E+00 | 7.4498E−01 | −9.2834E−01 | 2.1108E−01 |
| S8 | −1.0177E+00 | 2.7565E+00 | −6.9034E+00 | 1.2681E+01 | −1.6936E+01 | 1.5892E+01 | −9.8693E+00 | 3.6182E+00 | −5.8495E−01 |
| S9 | −5.6865E−01 | 1.1013E+00 | −1.7775E+00 | 1.9940E+00 | −1.7415E+00 | 1.1075E+00 | −4.8101E−01 | 1.3111E−01 | −1.6703E−02 |
| S10 | −9.6820E−01 | 1.3350E−01 | 1.7107E−01 | −5.4864E−01 | 5.1687E−01 | −2.4876E−01 | 6.6953E−02 | −9.6656E−03 | 5.8836E−04 |
| S11 | −4.8033E−01 | 5.9281E−01 | −4.3339E−01 | 2.0153E−01 | −5.9293E−02 | 1.0977E−02 | −1.2379E−03 | 7.7476E−05 | −2.0525E−06 |
| S12 | −4.1934E−01 | 3.8118E−01 | −2.2607E−01 | 8.5494E−02 | −2.0868E−02 | 3.2359E−03 | −3.0353E−04 | 1.5487E−05 | −3.2500E−07 |

Figure 16A:
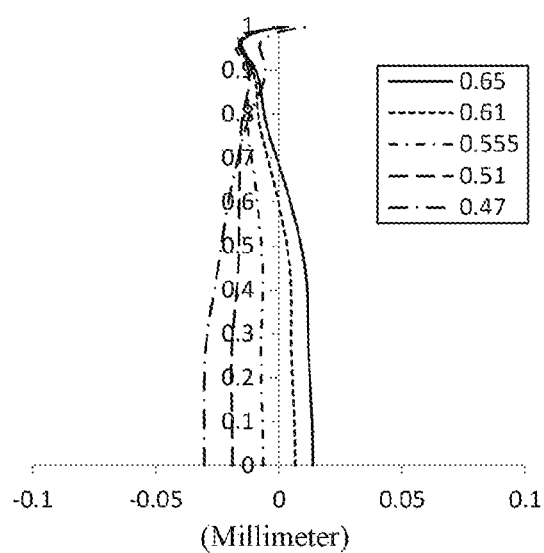
FIG. 16A illustrates a longitudinal aberration curve of the camera lens assembly according to embodiment 8.
Figure 16B:
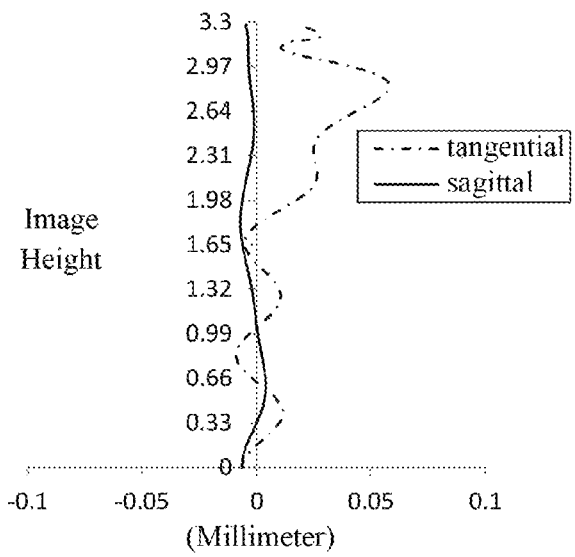
FIG. 16B illustrates an astigmatic curve of the camera lens assembly according to embodiment 8.
Figure 16C:
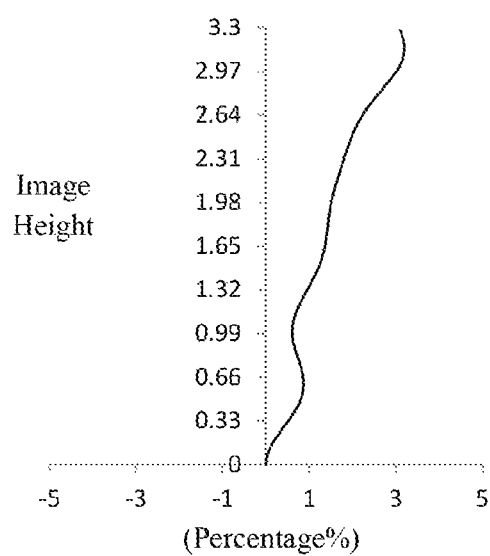
FIG. 16C illustrates a distortion curve of the camera lens assembly according to embodiment 8.
Figure 16D:
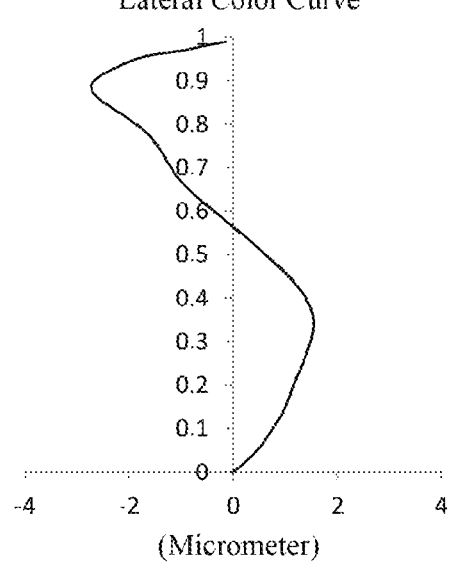
FIG. 16D illustrates a lateral color curve of the camera lens assembly according to embodiment 8.

FIG. 16A illustrates a longitudinal aberration curve of the camera lens assembly according to embodiment 8, representing deviations of focal points converged by light of different wavelengths after passing through the camera lens assembly. FIG. 16B illustrates an astigmatic curve of the camera lens assembly according to embodiment 8, representing a curvature of a tangential plane and a curvature of a sagittal plane. FIG. 16C illustrates a distortion curve of the camera lens assembly according to embodiment 8, representing amounts of distortion corresponding to different image heights. FIG. 16D illustrates a lateral color curve of the camera lens assembly according to embodiment 8, representing deviations of different image heights on an image plane after light passes through the camera lens assembly. It can be seen from FIG. 16A to FIG. 16D that the camera lens assembly provided in embodiment 8 can achieve a good imaging quality.

Embodiment 9

Figure 17:
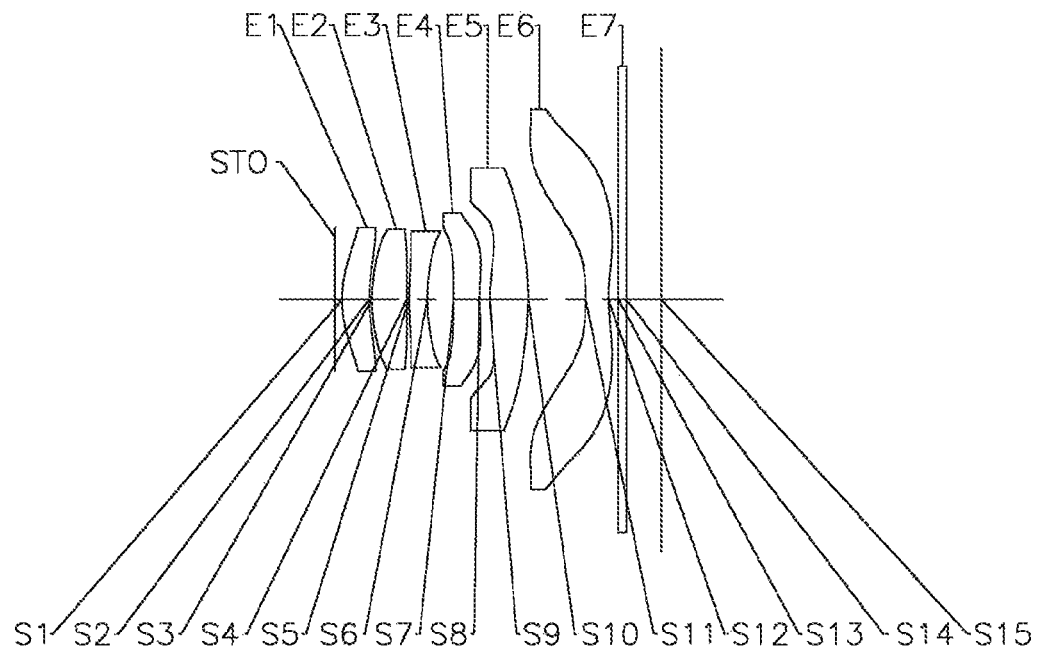
FIG. 17 is a schematic structural view of a camera lens assembly according to embodiment 9 of the present disclosure.

A camera lens assembly according to embodiment 9 of the present disclosure is described below with reference to FIG. 17 to FIG. 18D. FIG. 17 is a schematic structural view of the camera lens assembly according to embodiment 9 of the present disclosure.

As shown in FIG. 17, the camera lens assembly includes, sequentially from an object side to an image side along an optical axis: a stop STO, a first lens E1, a second lens E2, a third lens E3, a fourth lens E4, a fifth lens E5, a sixth lens E6, an optical filter E7, and an image plane S15.

The first lens E1 has a positive refractive power, and an object-side surface S1 thereof is a convex surface, and an image-side surface S2 thereof is a concave surface. The second lens E2 has a positive refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

In the embodiment 9, a total effective focal length of the camera lens assembly satisfies f=3.60 mm, a distance along the optical axis from the object-side surface S1 of the first lens E1 to the image plane S15. satisfies TTL=4.30 mm, and a maximal field-of-view of the camera lens assembly FOV=82.0°.

Table 17 is a table showing basic parameters of the camera lens assembly of embodiment 9, wherein the units for the radius of curvature, the thickness and focal length are millimeter (mm). Table 18 below shows high-order coefficients applicable to each aspheric surface S1-S12 in embodiment 9, wherein the surface shape of each aspheric surface can be defined by the formula (1) given in the above embodiment 1.

TABLE 17

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | 0.1000 | | | | |
| S1 | aspheric | 1.6515 | 0.3633 | 1.54 | 56.1 | 11.33 | −13.1638 |
| S2 | aspheric | 2.0776 | 0.0382 | | | | −5.6548 |
| S3 | aspheric | 2.0779 | 0.4708 | 1.54 | 56.1 | 4.16 | −2.3176 |
| S4 | aspheric | 22.6954 | 0.0300 | | | | −99.0000 |
| S5 | aspheric | 5.0491 | 0.2450 | 1.67 | 19.2 | −10.50 | −4.1762 |
| S6 | aspheric | 2.8955 | 0.3582 | | | | 6.8821 |
| S7 | aspheric | 71.7725 | 0.3413 | 1.57 | 37.3 | −4.41 | 99.0000 |
| S8 | aspheric | 2.4248 | 0.1397 | | | | −0.2111 |
| S9 | aspheric | 2.0436 | 0.5227 | 1.57 | 37.3 | 2.45 | 0.0074 |
| S10 | aspheric | −4.0120 | 0.7718 | | | | −30.3523 |
| S11 | aspheric | −5.5573 | 0.3053 | 1.54 | 56.1 | −2.93 | 3.7630 |

TABLE 17-continued

| Surface number | Surface type | Radius of curvature | Thickness/ Distance | Material Refractive index | Material Abbe number | Focal length | Conic coefficient |
|---|---|---|---|---|---|---|---|
| S12 | aspheric | 2.2902 | 0.1352 | | | | −17.9075 |
| S13 | spherical | infinite | 0.1100 | 1.52 | 64.2 | | |
| S14 | spherical | infinite | 0.4686 | | | | |
| S15 | spherical | infinite | | | | | |

TABLE 18

| Surface number | A4 | A6 | A8 | A10 | A12 | A14 | A16 | A18 | A20 |
|---|---|---|---|---|---|---|---|---|---|
| S1 | 2.9507E−01 | −7.3713E−01 | 1.8534E+00 | −4.6573E+00 | 8.8977E+00 | −1.1930E+01 | 1.0329E+01 | −5.1049E+00 | 1.0870E+00 |
| S2 | −2.1627E−01 | 2.3366E−01 | −1.9159E−01 | 6.3506E−02 | −3.6794E−04 | 0.0000E+00 | 0.0000E+00 | 0.0000E+00 | 0.0000E+00 |
| S3 | −1.7405E−01 | 2.8941E−01 | −9.4036E−02 | 0.0000E+00 | 0.0000E+00 | 0.0000E+00 | 0.0000E+00 | 0.0000E+00 | 0.0000E+00 |
| S4 | −9.9702E−02 | 1.9447E−02 | 6.3851E−02 | −3.5617E−02 | 0.0000E+00 | 0.0000E+00 | 0.0000E+00 | 0.0000E+00 | 0.0000E+00 |
| S5 | −9.6944E−02 | 4.0429E−02 | −4.7542E−01 | 1.4270E+00 | −1.9240E+00 | 1.5178E+00 | −6.8091E−01 | 1.3141E−01 | 0.0000E+00 |
| S6 | −4.0747E−02 | 9.8573E−02 | −5.2198E−01 | 8.2927E−01 | −6.9257E−04 | −1.3389E+00 | 1.4740E+00 | −5.1506E−01 | 0.0000E+00 |
| S7 | −3.9752E−02 | 1.4161E+00 | −4.8485E+00 | 1.2107E+01 | −2.2006E+01 | 2.7830E+01 | −2.3261E+01 | 1.1496E+01 | −2.5017E+00 |
| S8 | −9.0904E−01 | 2.6545E+00 | −8.1278E+00 | 1.8847E+01 | −3.0875E+01 | 3.3721E+01 | −2.3151E+01 | 8.9885E+00 | −1.4951E+00 |
| S9 | −4.9072E−01 | 9.2455E−01 | −1.9889E+00 | 3.4233E+00 | −4.4149E+00 | 3.8548E+00 | −2.1401E+00 | 6.7776E−01 | −9.1924E−02 |
| S10 | −2.7791E−02 | −4.2787E−02 | 2.2034E−01 | −2.9245E−01 | 1.8972E−01 | −6.9115E−02 | 1.4504E−02 | −1.6534E−03 | 8.0541E−05 |
| S11 | −3.4966E−01 | 2.3990E−01 | −5.6612E−02 | −1.1736E−02 | 1.2305E−02 | −3.8218E−03 | 6.1616E−04 | −5.1903E−05 | 1.8096E−06 |
| S12 | −1.6443E−01 | 8.9579E−02 | −2.3540E−02 | −2.0582E−03 | 3.5437E−03 | −1.1769E−03 | 1.9609E−04 | −1.6650E−05 | 5.6907E−07 |

Figure 18A:
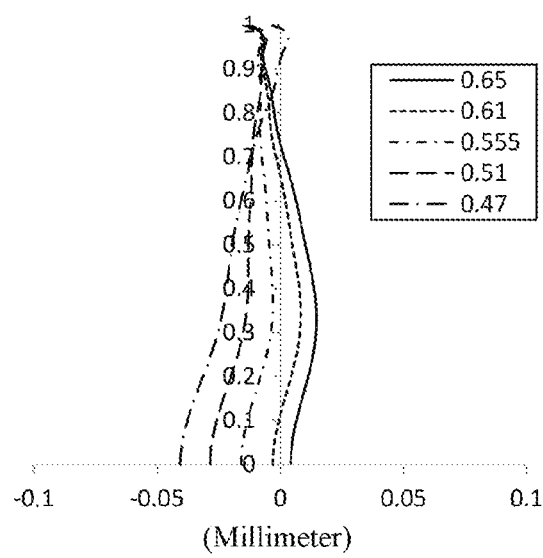
FIG. 18A illustrates a longitudinal aberration curve of the camera lens assembly according to embodiment 9.
Figure 18B:
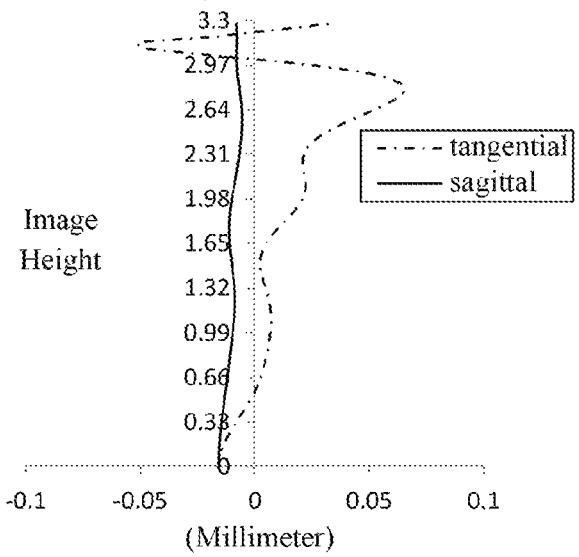
FIG. 18B illustrates an astigmatic curve of the camera lens assembly according to embodiment 9.

FIG. 18A illustrates a longitudinal aberration curve of the camera lens assembly according to embodiment 9, representing deviations of focal points converged by light of different wavelengths after passing through the camera lens assembly. FIG. 18B illustrates an astigmatic curve of the camera lens assembly according to embodiment 9, representing a curvature of a tangential plane and a curvature of a sagittal plane. FIG. 18C illustrates a distortion curve of the camera lens assembly according to embodiment 9, representing amounts of distortion corresponding to different image heights. FIG. 18D illustrates a lateral color curve of the camera lens assembly according to embodiment 9, representing deviations of different image heights on an image plane after light passes through the camera lens assembly. It can be seen from FIG. 18A to FIG. 18D that the camera lens assembly provided in embodiment 9 can achieve a good imaging quality.

In view of the above, embodiments 1 to 9 respectively satisfy the relationship shown in Table 19.

The present disclosure further provides a camera apparatus having a photosensitive element, which may be a photosensitive charge-coupled device (CCD) or complementary metal-oxide semiconductor (CMOS). The camera apparatus may be an independent camera device such as a digital camera, or may be a camera module integrated in a mobile electronic device such as a mobile phone. The camera apparatus is equipped with the camera lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solu-

TABLE 19

| Conditional\Embodiment | 1 | 2 | 3 | 4 | 5 | 6 | 7 | 8 | 9 |
|---|---|---|---|---|---|---|---|---|---|
| f/f6 | −1.44 | −1.56 | −1.55 | −1.22 | −1.49 | −1.32 | −1.52 | −1.32 | −1.23 |
| Ts (mm) | 0.040 | 0.038 | 0.040 | 0.040 | 0.040 | 0.036 | 0.038 | 0.150 | 0.100 |
| ImgH/f | 0.85 | 0.90 | 0.90 | 0.92 | 0.94 | 0.88 | 0.88 | 0.87 | 0.91 |
| f/R11 | −0.71 | −0.67 | −0.66 | −0.64 | −0.62 | −0.71 | −0.83 | −0.70 | −0.65 |
| \|V4−V5\| | 11.29 | 11.29 | 11.29 | 11.29 | 14.38 | 11.29 | 11.29 | 0.00 | 0.00 |
| f/f5 | 1.01 | 1.03 | 1.07 | 0.99 | 1.33 | 0.64 | 0.75 | 1.52 | 1.47 |
| f/f3 | −0.35 | −0.51 | −0.28 | 0.04 | −0.51 | 0.02 | −0.05 | −0.41 | −0.34 |
| f/f1 + f/f2 | 1.19 | 1.25 | 1.05 | 0.94 | 1.18 | 0.97 | 0.94 | 1.26 | 1.18 |
| f/R9-f/R10 | 1.82 | 1.87 | 1.93 | 1.78 | 2.44 | 1.14 | 1.33 | 2.71 | 2.66 |
| R5/R6 | 1.61 | 2.51 | 1.52 | 0.98 | 3.43 | 0.99 | 1.11 | 1.92 | 1.74 |
| T56/CT6 | 2.28 | 1.40 | 1.20 | 1.18 | 1.33 | 0.86 | 1.48 | 2.49 | 2.53 |
| (T12 + T23)/ΣAT | 0.04 | 0.07 | 0.06 | 0.09 | 0.09 | 0.09 | 0.06 | 0.05 | 0.05 |
| f123/T34 | 11.77 | 14.19 | 12.05 | 11.94 | 15.73 | 11.52 | 9.89 | 11.06 | 11.47 |
| TTL/ImgH | 1.36 | 1.37 | 1.34 | 1.34 | 1.34 | 1.38 | 1.31 | 1.33 | 1.31 |

What is claimed is:

1. A camera lens assembly comprising, sequentially from an object side to an image side of the camera lens assembly along an optical axis:
   a stop;
   a first lens having a positive refractive power, and an object-side surface of the first lens being convex;
   a second lens having a positive refractive power;
   a third lens;
   a fourth lens;
   a fifth lens having a positive refractive power;
   a sixth lens having a negative refractive power, and an object-side surface of the sixth lens being concave; and
   wherein, a distance Ts along the optical axis from the stop to the object-side surface of the first lens satisfies: 0.04 mm ≤Ts<0.2 mm, wherein an object to image direction is a positive axis direction,
   wherein a total effective focal length f of the camera lens assembly and a radius of curvature R11 of the object-side surface of the sixth lens satisfy −1.0<f/R11<−0.5.

2. The camera lens assembly according to claim 1, wherein an abbe number V4 of the fourth lens and an abbe number V5 of the fifth lens satisfy |V4−V5|≤15.

3. The camera lens assembly according to claim 1, wherein a total effective focal length f of the camera lens assembly and an effective focal length f5 of the fifth lens satisfy 0.5<f/f5≤1.52.

4. The camera lens assembly according to claim 1, wherein a total effective focal length f of the camera lens assembly and an effective focal length f3 of the third lens satisfy −0.6<f/f3<0.1.

5. The camera lens assembly according to claim 1, wherein a total effective focal length f of the camera lens assembly, an effective focal length f1 of the first lens and an effective focal length f2 of the second lens satisfy f/f1+f/f2≤1.3.

6. The camera lens assembly according to claim 1, wherein a total effective focal length f of the camera lens assembly, a radius of curvature R9 of the object-side surface of the fifth lens and a radius of curvature R10 of an image-side surface of the fifth lens satisfy f/R9−f/R10<3.0.

7. The camera lens assembly according to claim 1, wherein a radius of curvature R5 of an object-side surface of the third lens and a radius of curvature R6 of an image-side surface of the third lens satisfy 0<R5/R6<3.5.

8. The camera lens assembly according to claim 1, wherein a combined focal length f123 of the first lens, the second lens and the third lens, and a spaced interval T34 along the optical axis between the third lens and the fourth lens satisfy 9<f123/T34<17.

9. The camera lens assembly according to claim 1, wherein a distance TTL along the optical axis from the object-side surface of the first lens to an image plane of the camera lens assembly and half of a diagonal length ImgH of an effective pixel area on the image plane of the camera lens assembly satisfy TTL/ImgH<1.5.

10. The camera lens assembly according to claim 1, wherein a total effective focal length f of the camera lens assembly and half of a diagonal length ImgH of an effective pixel area on an image plane of the camera lens assembly satisfy 0.85≤ImgH/f≤1.0.

11. A camera lens assembly comprising, sequentially from an object side to an image side of the camera lens assembly along an optical axis:
   a stop;
   a first lens having a positive refractive power, and an object-side surface of the first lens being convex;
   a second lens having a positive refractive power;
   a third lens;
   a fourth lens;
   a fifth lens having a positive refractive power, and an image-side surface of the fifth lens being convex;
   a sixth lens having a negative refractive power, and an object-side surface of the sixth lens being concave; and
   wherein a total effective focal length f of the camera lens assembly and an effective focal length f6 of the sixth lens satisfy −1.6≤f/f6≤−1.0;
   a radius of curvature R5 of an object-side surface of the third lens and a radius of curvature R6 of an image-side surface of the third lens satisfy 0<R5/R6<3.5; and
   a distance Ts along the optical axis from the stop to the object-side surface of the first lens satisfies: 0.04 mm ≤Ts<0.2 mm, wherein an object to image direction is a positive axis direction.

12. The camera lens assembly according to claim 11, wherein the total effective focal length f of the camera lens assembly and a radius of curvature R11 of the object-side surface of the sixth lens satisfy −1.0<f/R11<−0.5.

13. The camera lens assembly according to claim 11, wherein the total effective focal length f of the camera lens assembly and an effective focal length f5 of the fifth lens satisfy 0.5<f/f5≤1.52.

14. The camera lens assembly according to claim 11, wherein the total effective focal length f of the camera lens assembly and an effective focal length f3 of the third lens satisfy −0.6<f/f3<0.1.

15. The camera lens assembly according to claim 11, wherein the total effective focal length f of the camera lens assembly, an effective focal length f1 of the first lens and an effective focal length f2 of the second lens satisfy f/f1+f/f2≤1.3.

16. The camera lens assembly according to claim 11, wherein a spaced interval T56 along the optical axis between the fifth lens and the sixth lens and a center thickness CT6 along the optical axis of the sixth lens satisfy 0.8≤T56/CT6≤2.6.

17. The camera lens assembly according to claim 11, wherein a spaced interval T12 along the optical axis between the first lens and the second lens, a spaced interval T23 along the optical axis between the second lens and the third lens and a sum ΣAT of spaced intervals along the optical axis between any two adjacent lenses among the first lens to the sixth lens satisfy (T12+T23)/ΣAT<0.1.

18. The camera lens assembly according to claim 11, wherein a combined focal length f123 of the first lens, the second lens and the third lens and a spaced interval T34 along the optical axis between the third lens and the fourth lens satisfy 9<f123/T34<17.

19. The camera lens assembly according to claim 11, wherein the total effective focal length f of the camera lens assembly and the half of the diagonal length ImgH of the effective pixel area on the image plane of the camera lens assembly satisfy 0.85≤ImgH/f≤1.0.

* * * * *